United States Patent
Kelley

(10) Patent No.: US 6,737,078 B1
(45) Date of Patent: May 18, 2004

(54) PROCESS FOR ENHANCING CANINE AND FELINE REPRODUCTIVE PERFORMANCE

(75) Inventor: Russell L. Kelley, Eaton, OH (US)

(73) Assignee: The Iams Company, Dayton, OH (US)

(*) Notice: Subject to any disclaimer, the term of this patent is extended or adjusted under 35 U.S.C. 154(b) by 267 days.

(21) Appl. No.: 09/718,846

(22) Filed: Nov. 22, 2000

Related U.S. Application Data

(60) Provisional application No. 60/167,282, filed on Nov. 24, 1999.

(51) Int. Cl.$^7$ .............................. A23K 1/18; A23K 1/165
(52) U.S. Cl. ......................... 424/442; 424/438; 424/442
(58) Field of Search .................................. 424/438, 442

(56) References Cited

U.S. PATENT DOCUMENTS

| | | | | |
|---|---|---|---|---|
| 5,110,592 A | * | 5/1992 | Stitt ........................ | 424/195.1 |
| 5,508,307 A | * | 4/1996 | Horrobin et al. ........... | 514/560 |
| 5,686,490 A | * | 11/1997 | Okazaki et al. ............. | 514/558 |
| 5,932,258 A | * | 8/1999 | Sunvold ........................ | 426/2 |
| 6,156,355 A | * | 12/2000 | Shields, Jr. et al. ........... | 426/74 |
| 6,229,031 B1 | * | 5/2001 | Strohmaier et al. ......... | 554/156 |
| 6,384,077 B1 | * | 5/2002 | Peet et al. ................... | 514/560 |

FOREIGN PATENT DOCUMENTS

| | | |
|---|---|---|
| EP | 0 678 247 A | 10/1995 |
| EP | 0 678 247 A1 | * 10/1995 |
| WO | 99/66877 | * 12/1999 |

OTHER PUBLICATIONS

Isabelle Delton–Vandenbroucke et al; Lipids, "Effect of diet on the fatty acid and molecular species composition of dog retina phospholipids"; vol. 33, No. 12, 1998, pp. 1187–1193.

Robert J. Pawlosky et al; "Is dietary arachidonic acid necessary for feline reproduction?"; Journal of Nutrition; vol. 126, No. 4Suppl., 1996, pp. 1081S–1085S.

T.L. Frankel et al; "Fatty acid composition of tissues from omega 3–deficient and normal kittens"; Proceedings of the Nutrition Society of Australia; vol. 13, 1988, pp. 141.

M.G. Hayek et al; "Utilization of omega 3 fatty acids in companion animal nutrition"; World Review of Nutrition and Dietetics, vol. 83, 1998, pp. 176–185.

Frankel, T.L., et al., "Fatty Acid Composition of Tissues from Omega 3–deficient and Normal Kittens", *Proceedings of the Nutrition Society of Australia*, vol. 13, (1988), p. 141.

Hayek, M.G., et al., "Utilization of Omega 3 Fatty Acids in Companion Animal Nutrition", *World Review of Nutrition and Dietetics*, vol. 83, (1998), pp. 176–185.

Pawlosky, J.R., et al., "Symposium: Biological Effects of Dietary Arachidonic Acid, Is Dietary Arachidonic Acid Necessary for Feline Reproduction?", *Journal of Nutrition*, vol. 126, No. 4 suppl., (1996), pp. 1081S–1085S.

Vandenbroucke, D.I., et al., "Effect of Diet on the Fatty Acid and Molecular Species Composition of Dog Retina Phospholipids", *Lipids*, vol. 33, No. 12, (1998), pp. 1187–1193.

* cited by examiner

*Primary Examiner*—Thurman K. Page
*Assistant Examiner*—S. Tran
(74) *Attorney, Agent, or Firm*—Proctor & Gamble Company

(57) ABSTRACT

A process is provided for enhancing reproductive performance in a companion animal such as a dog or cat by feeding the animal a diet including omega-6 and omega-3 fatty acids in a ratio of from about 3.5:1 to about 12.5:1. When an animal is fed the diet of the present invention, the essential fatty acid status in the animal is maintained, and litter size is maintained through subsequent parities.

52 Claims, 19 Drawing Sheets

Frequency occurrence for number of pups born.

Mean = 6.13 ± 1.87

Pup Number Born Alive

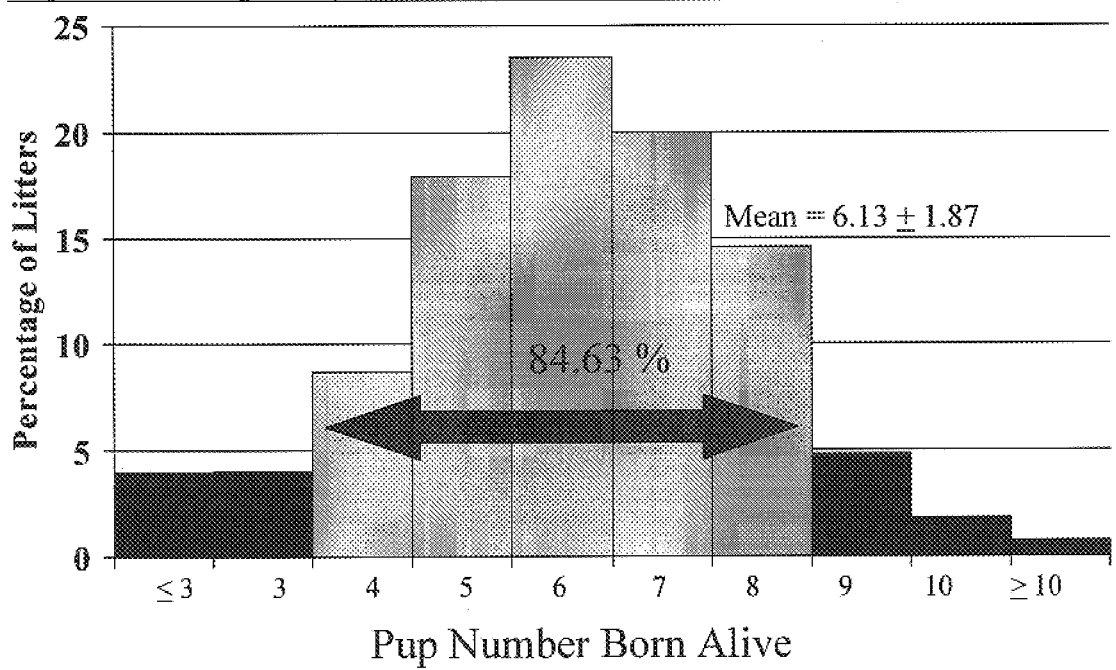
Figure 1. Frequency occurrence for number of pups born.

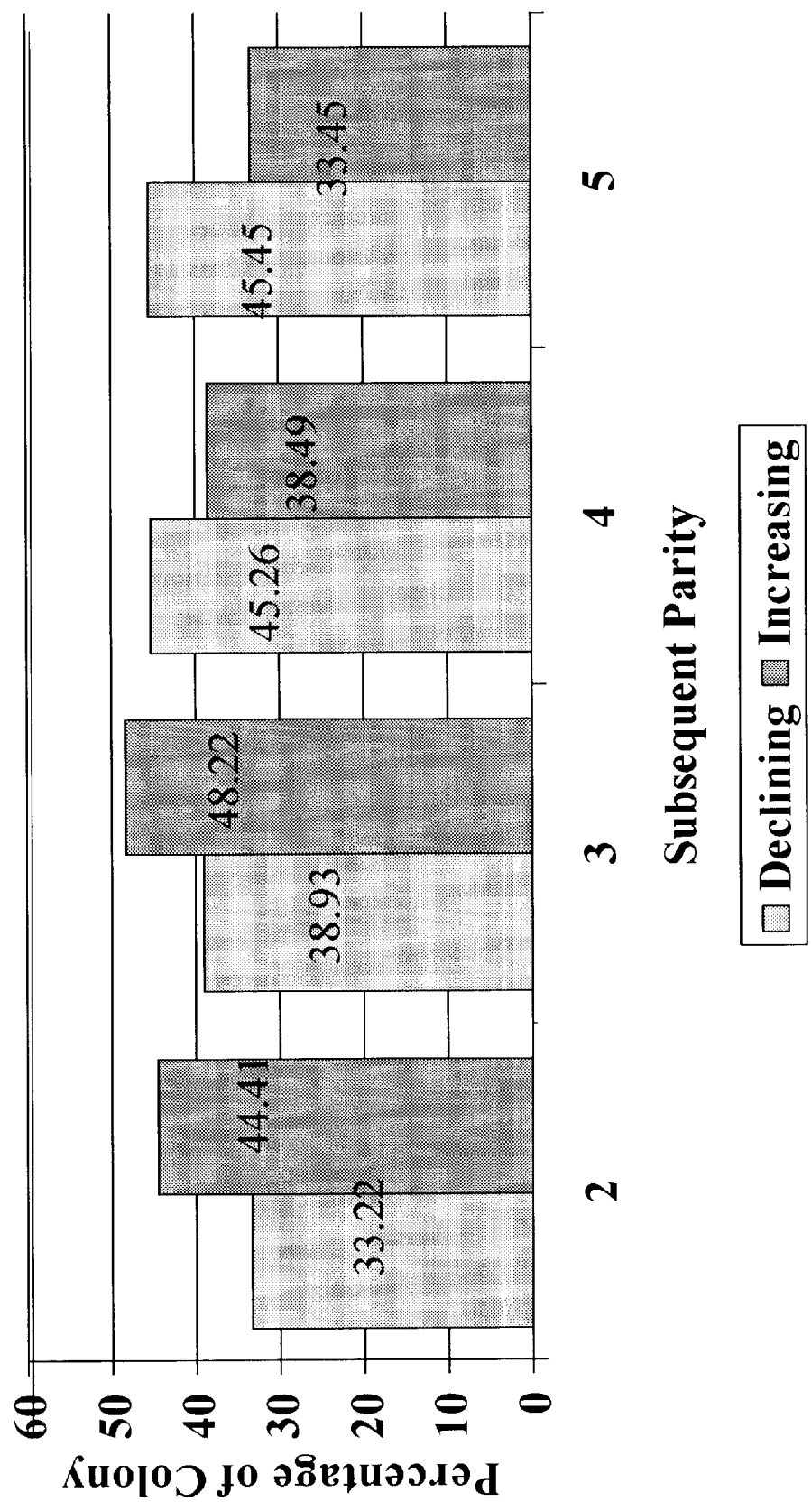
Figure 2. Percentage of bitches with subsequent parity decline or increase in litter size relative to previous parity.

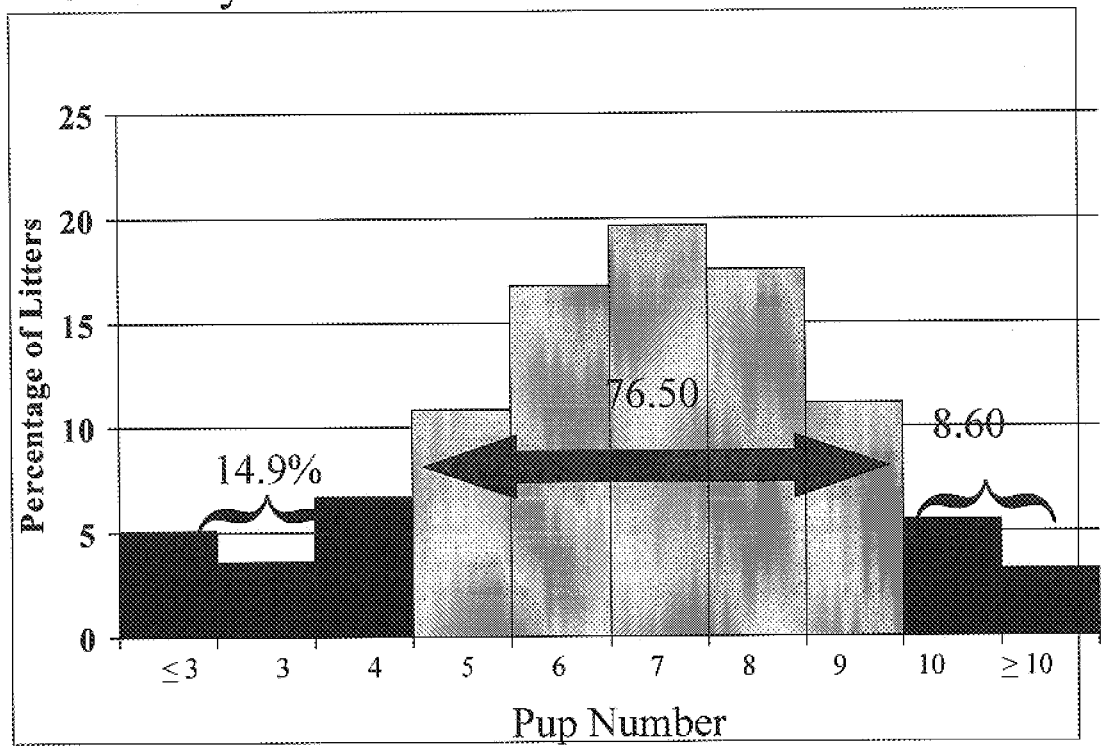
Figure 3. Frequency plot of pup number born for colony II across all diets.

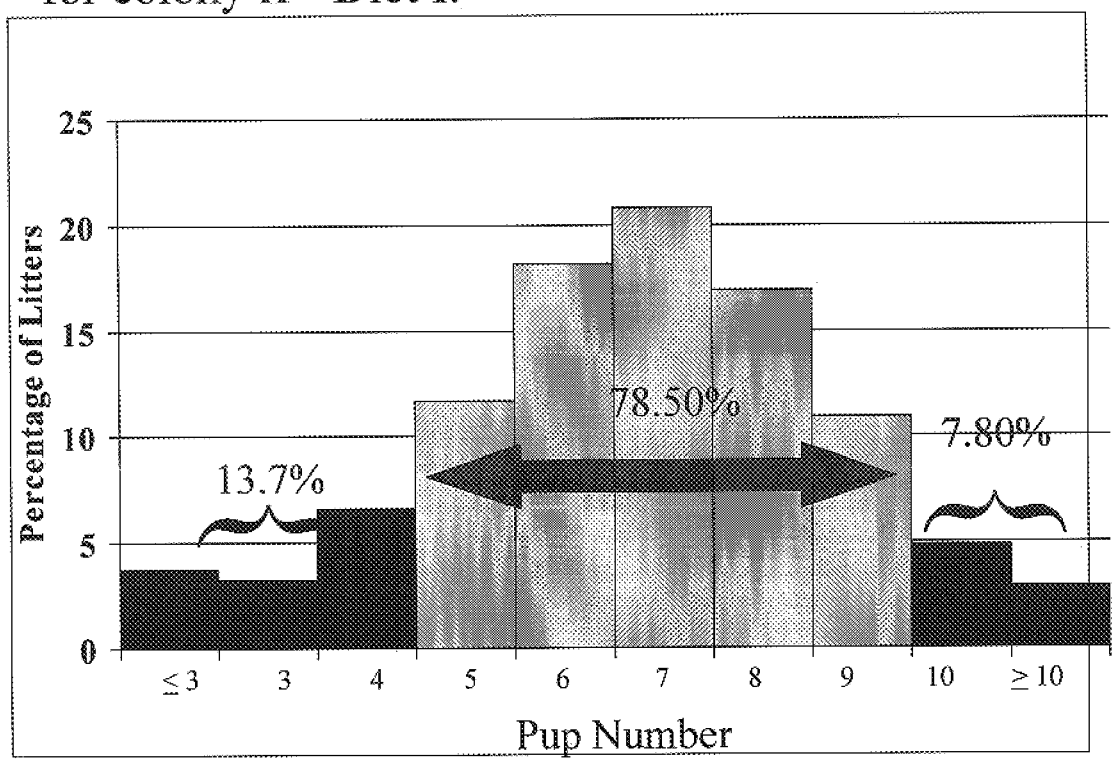
Figure 4. Frequency plot of pup number born for colony II - Diet I.

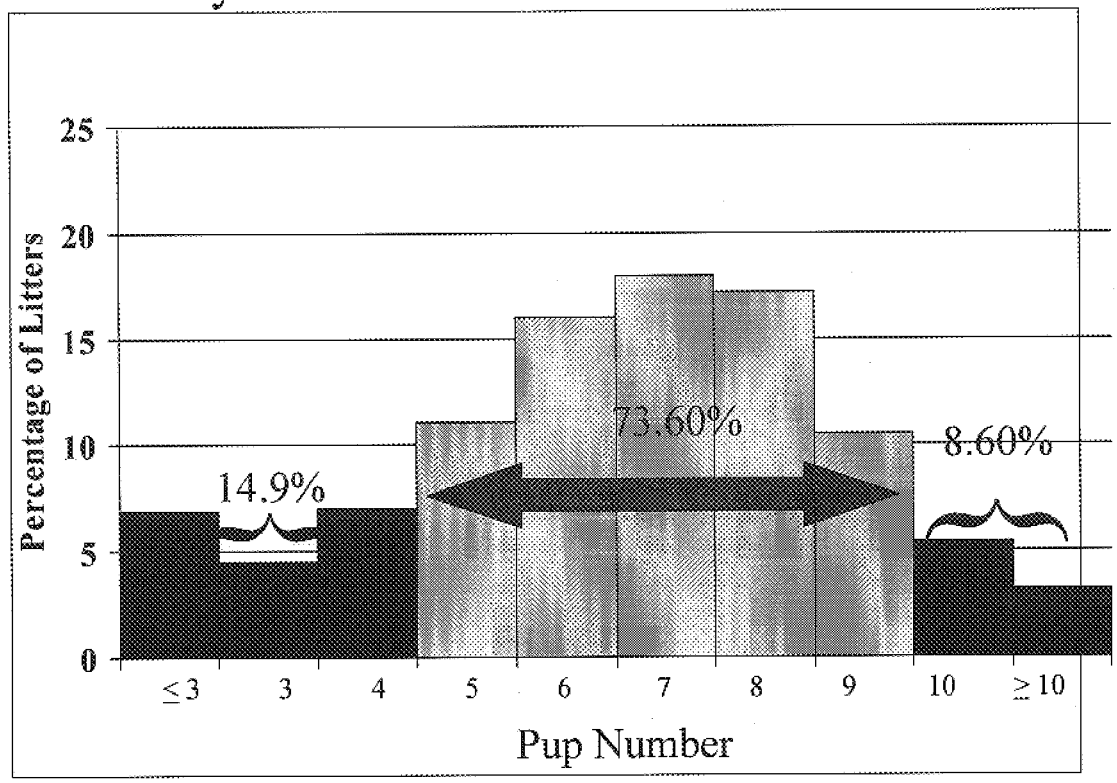
Figure 5. Frequency plot of pup number born for colony II - Diet II.

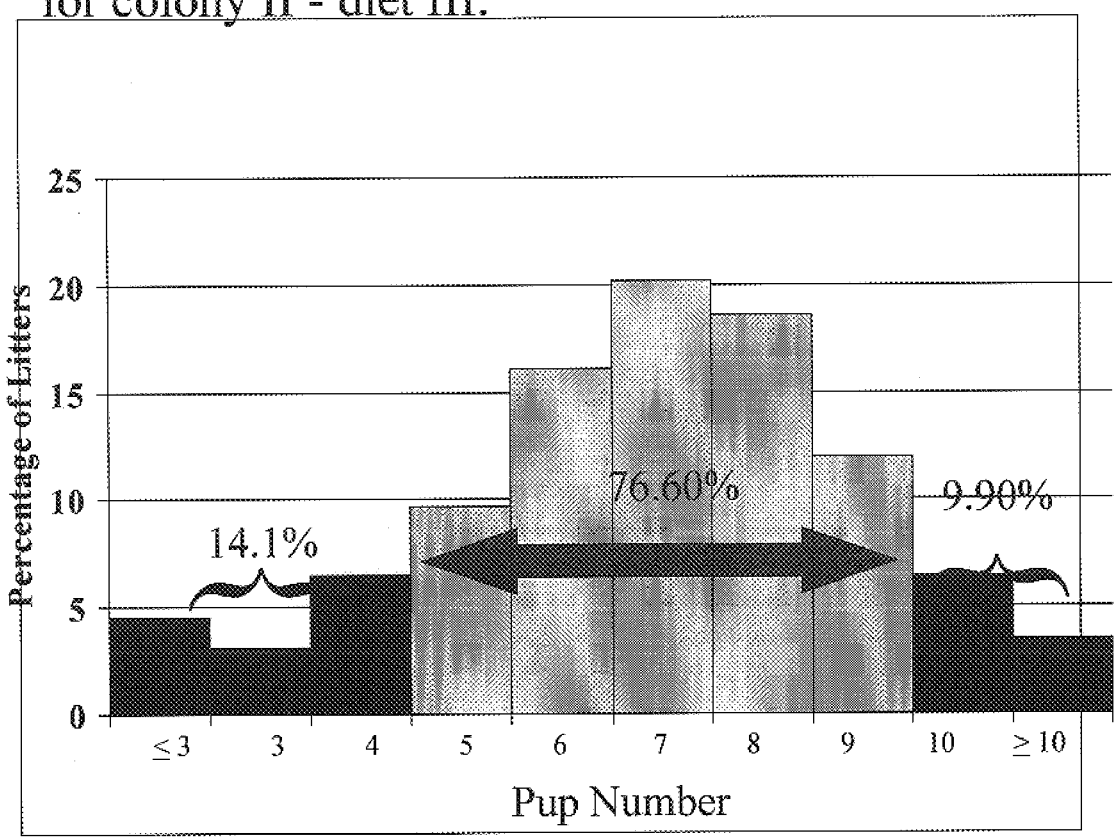
Figure 6. Frequency plot of pup number born for colony II - diet III.

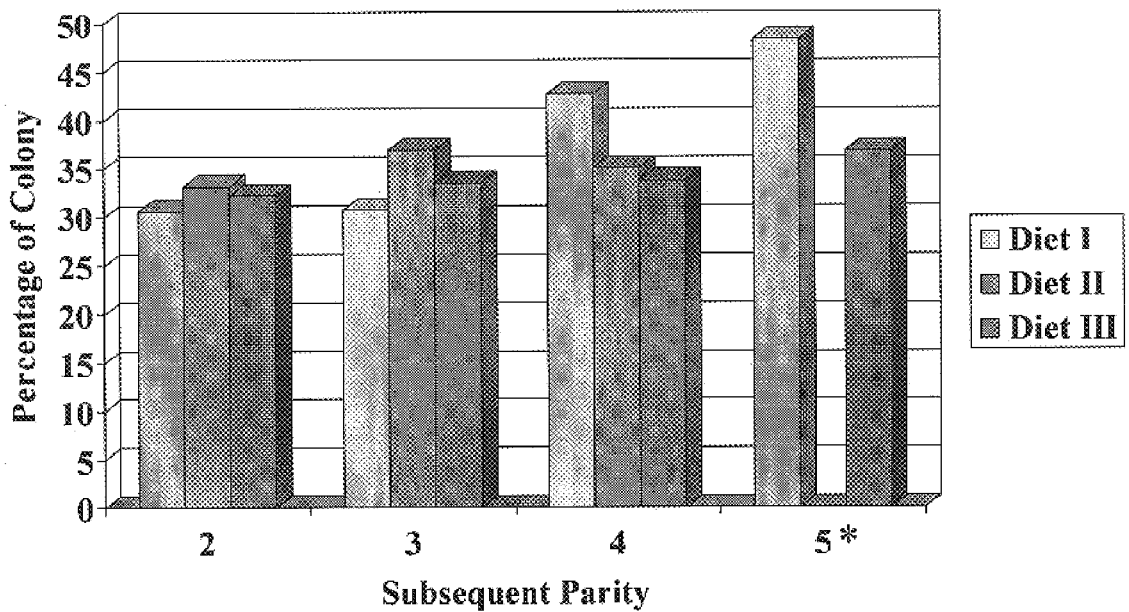
Figure 7. Percentage of colony decreasing in litter size relative to previous litter.
*Insufficient animal numbers for Diet II

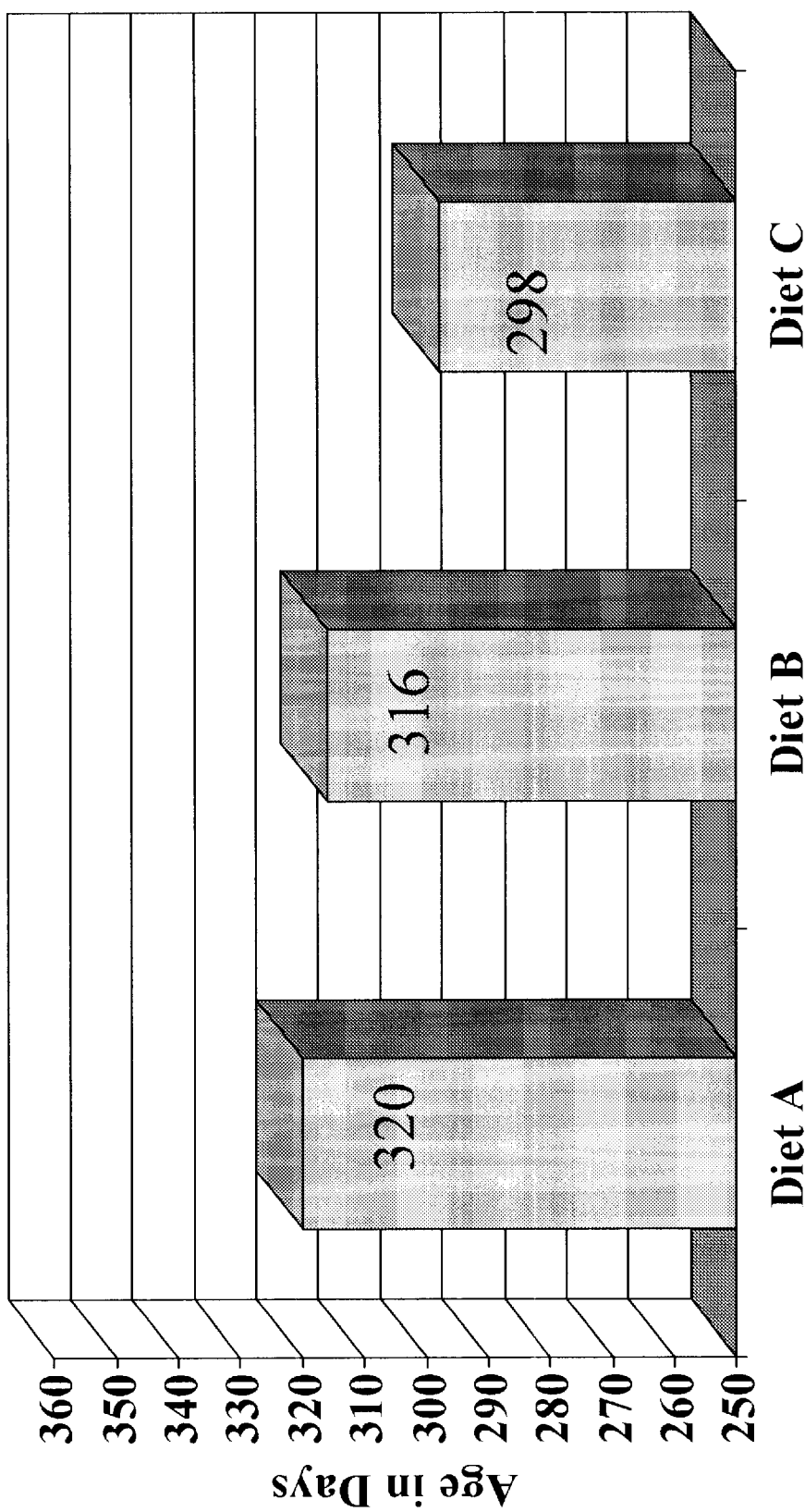
Figure 8. Effect of diet on age at first estrus

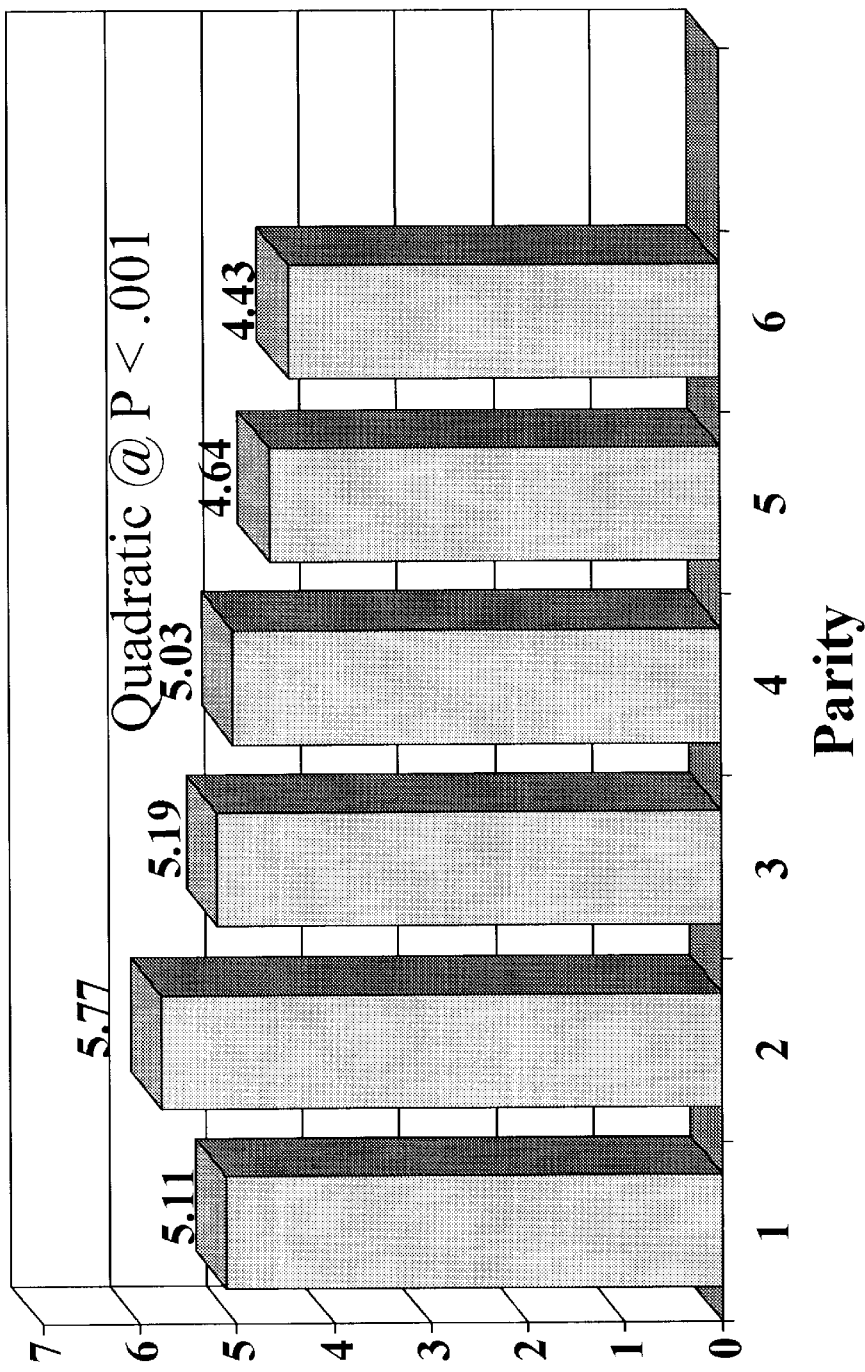
Figure 9. Effect of Parity on Feline Litter Size - Number Born

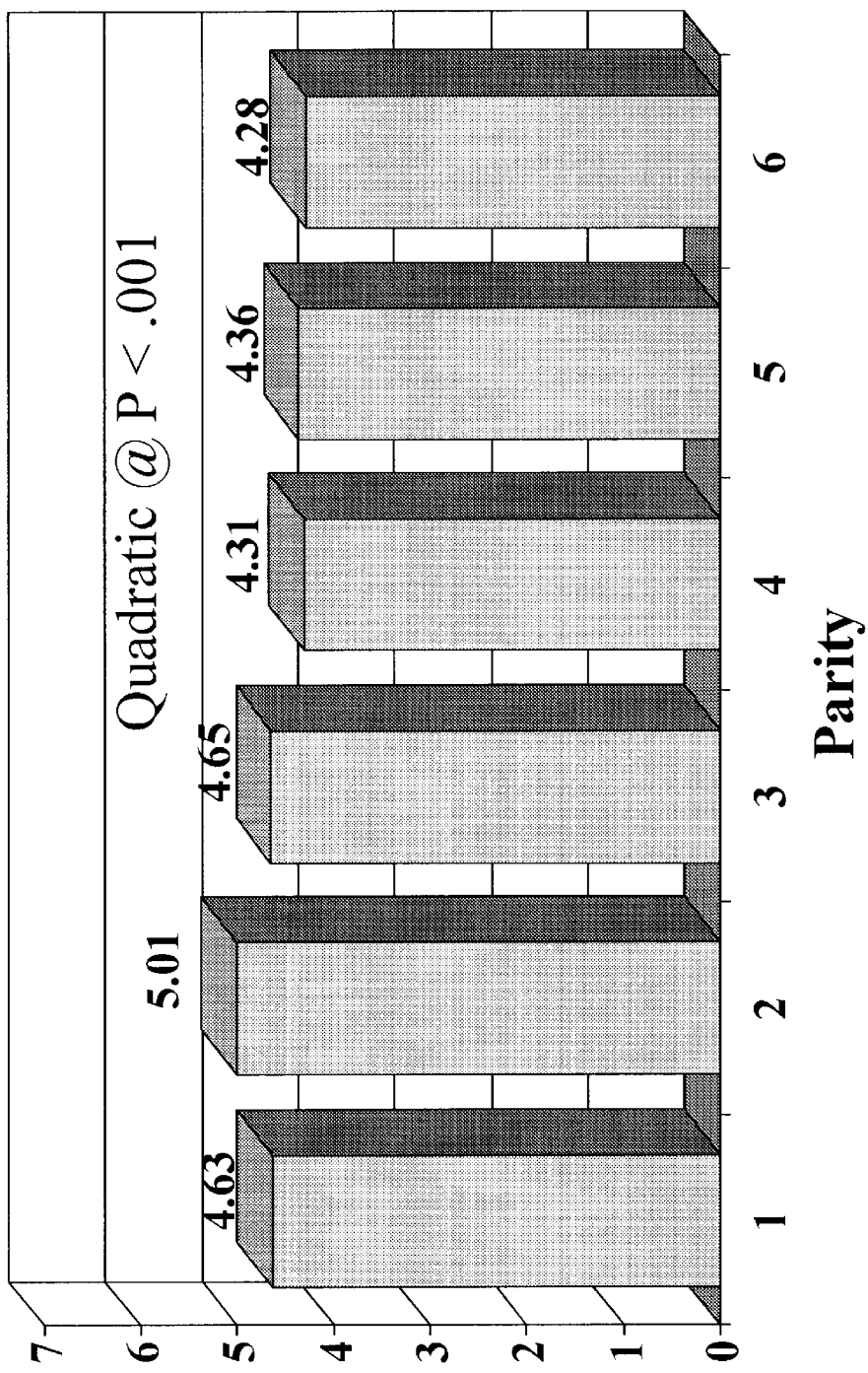

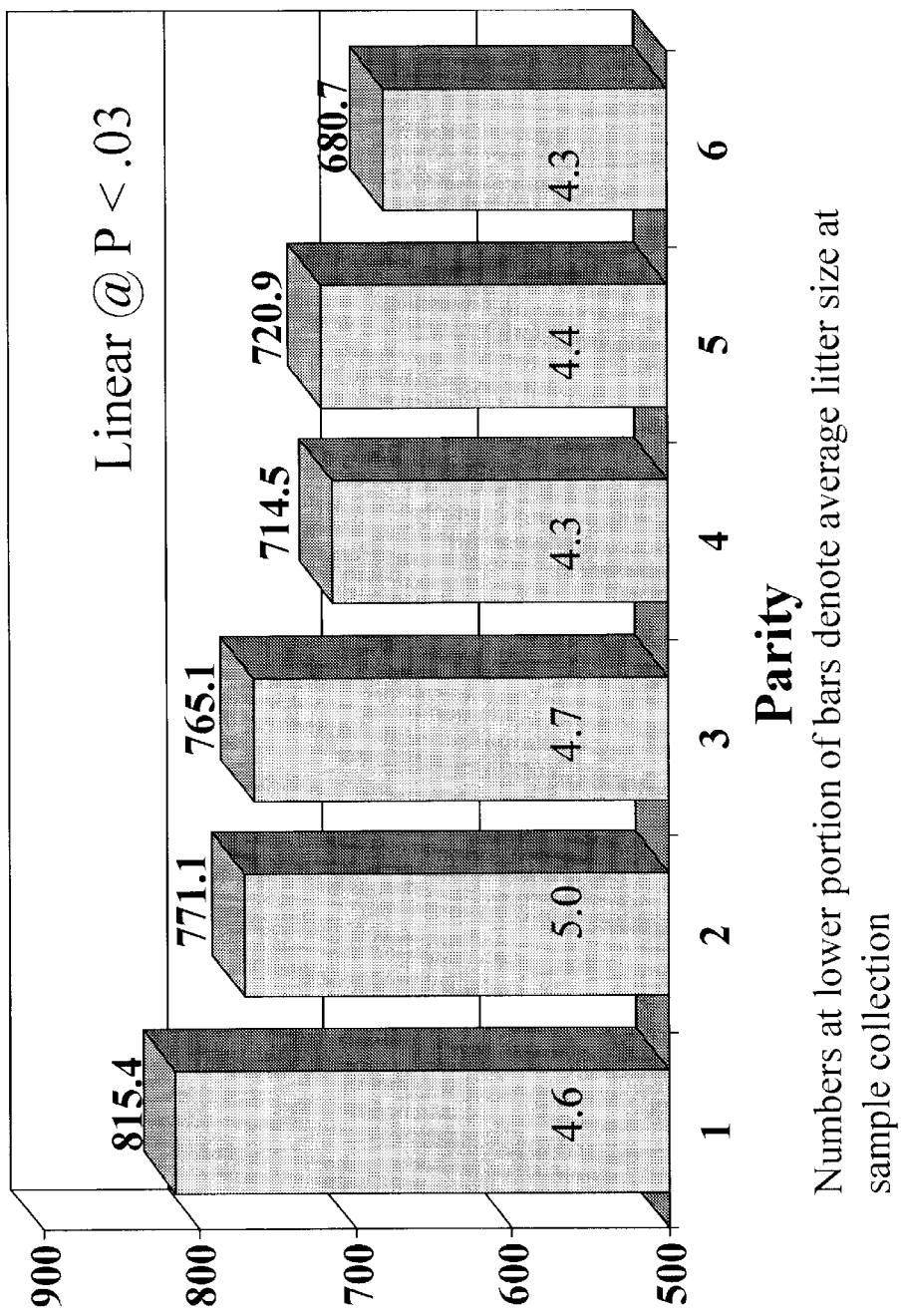
Figure 11. Effect of Parity on Feline Litter Weaning Weight
Numbers at lower portion of bars denote average litter size at sample collection

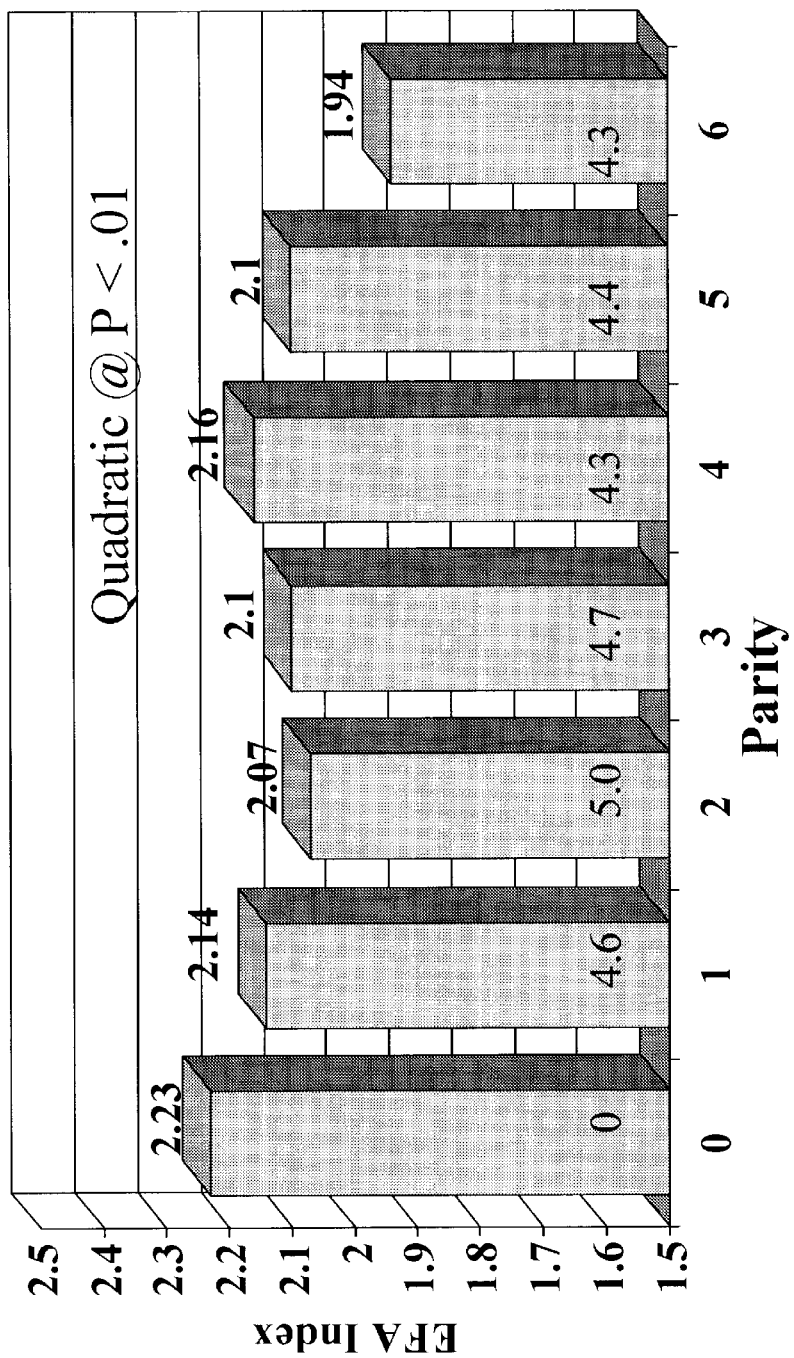

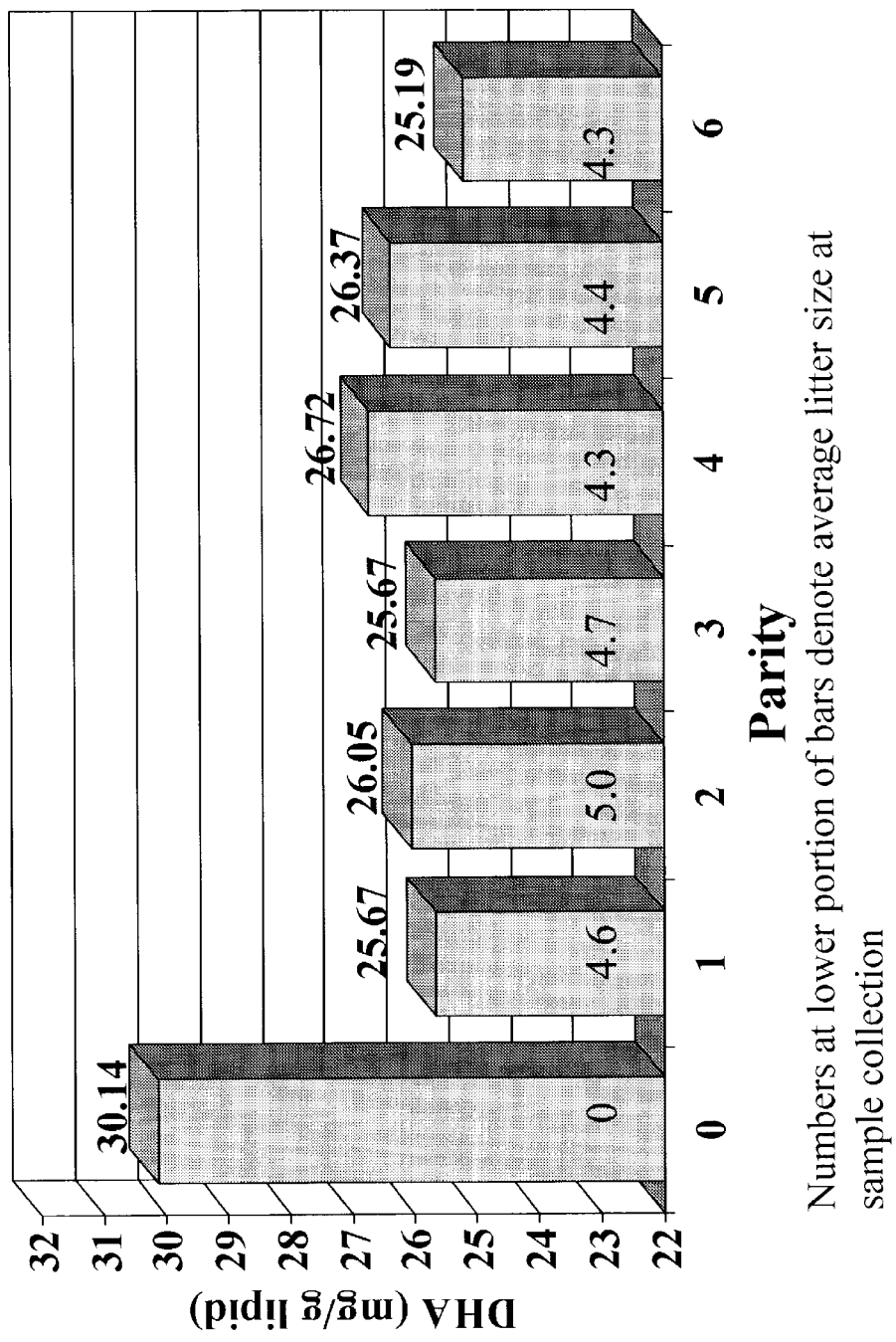
Figure 13. Effect of Parity on DHA Content in Maternal Feline RBC Membranes
Numbers at lower portion of bars denote average litter size at sample collection

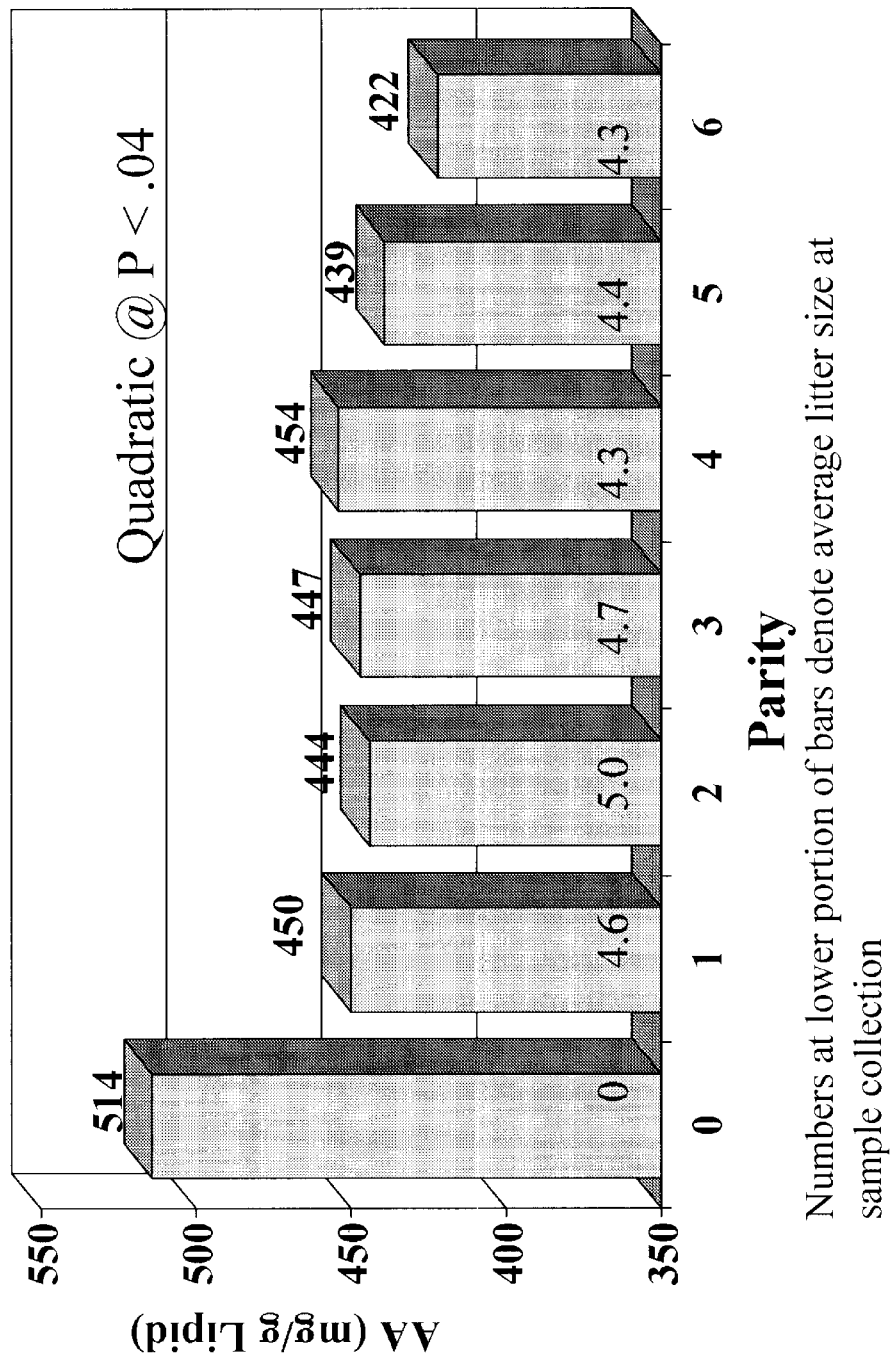
Figure 14. Effect of Parity on AA Content in Maternal Feline RBC Membranes

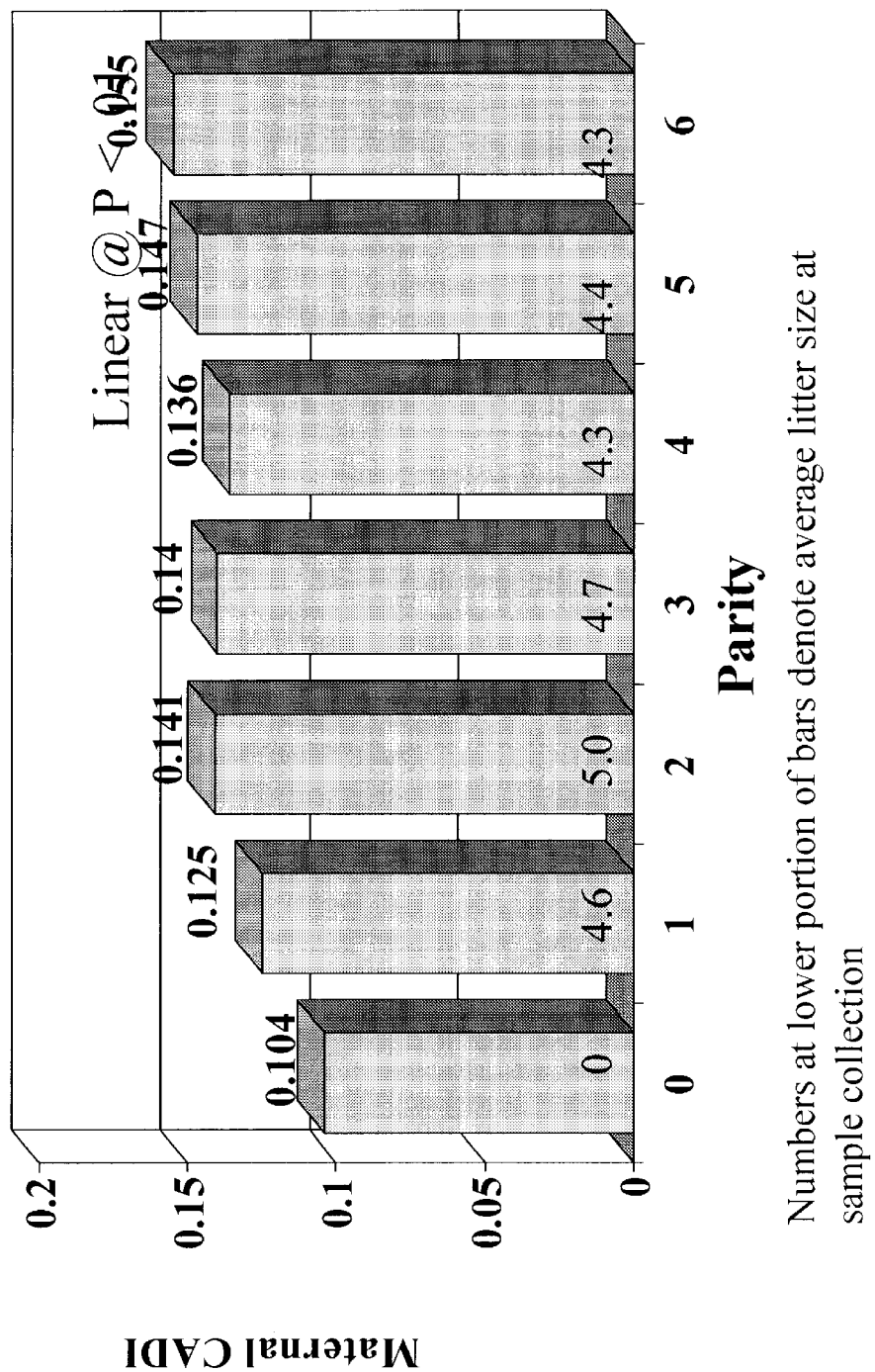
Figure 15. Effect of Parity on Feline Maternal CADI
Numbers at lower portion of bars denote average litter size at sample collection

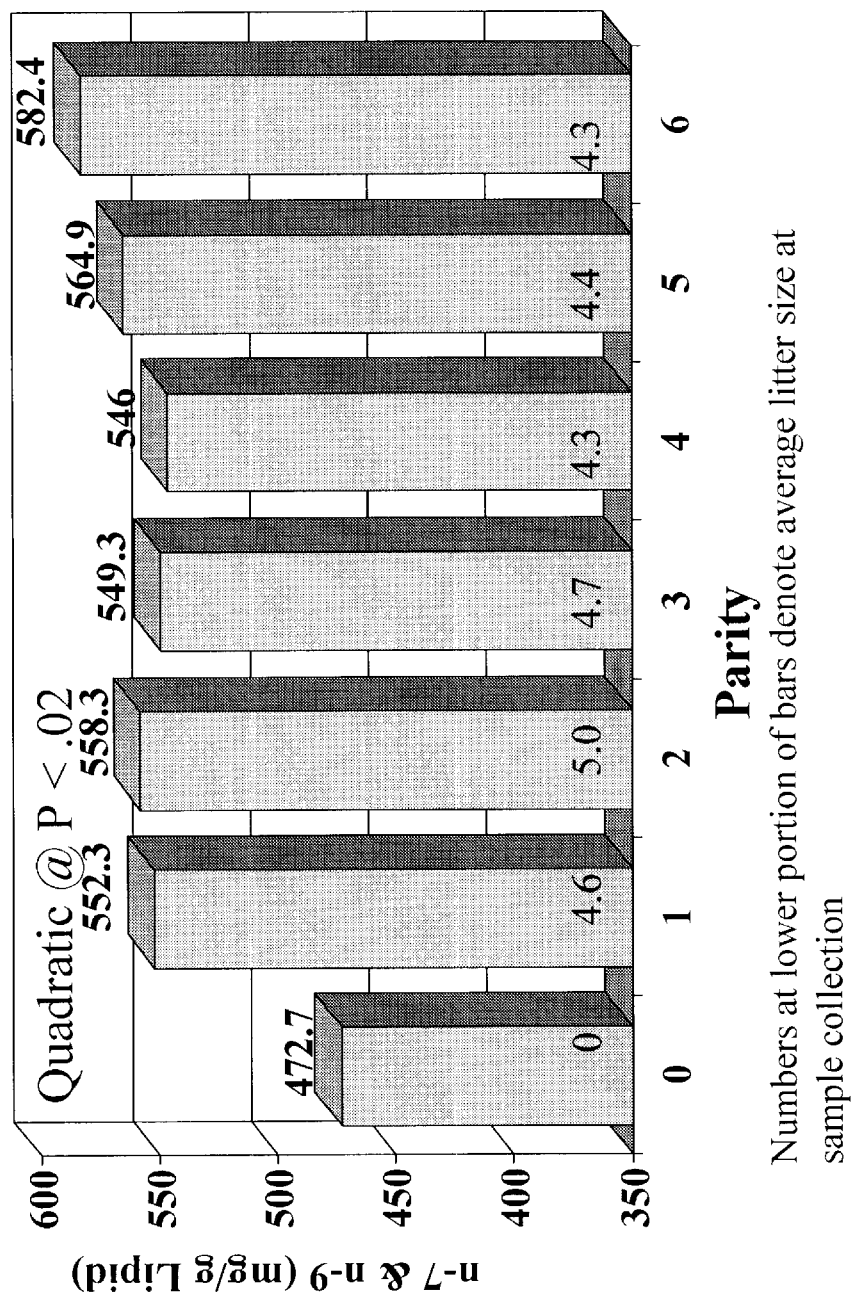
Figure 16. Effect of Parity on Total n-7 and n-9 Content in Maternal Feline RBC Membranes
Numbers at lower portion of bars denote average litter size at sample collection

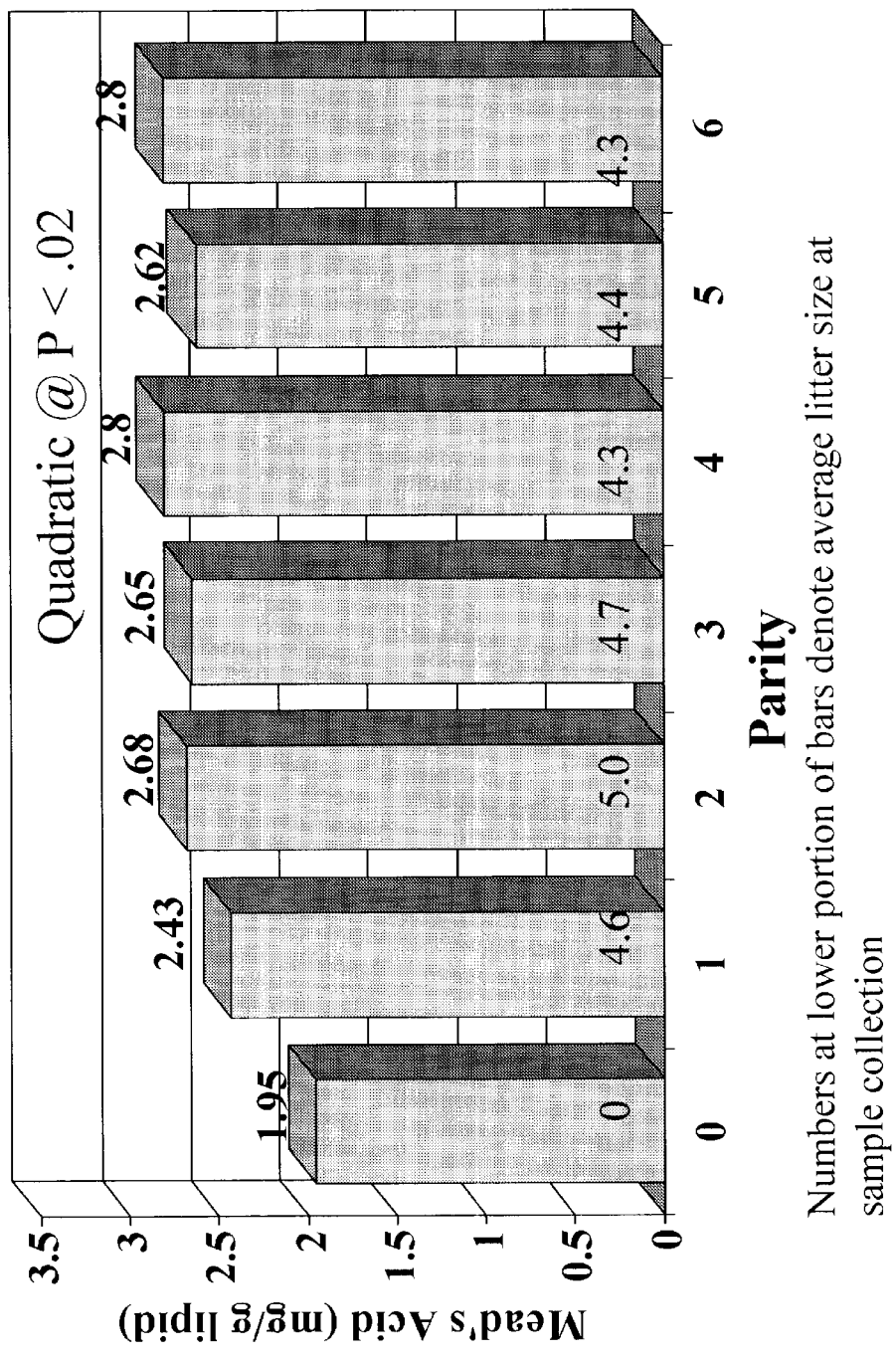
Figure 17. Effect of Parity on Meads' Acid Content in Maternal Feline RBC Membranes

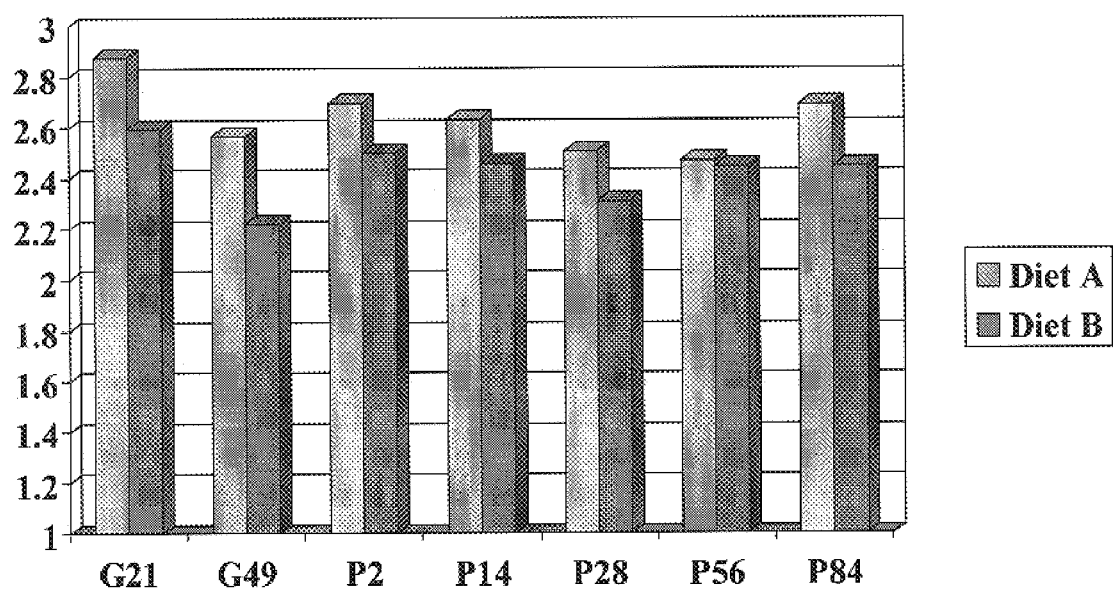
Figure 18. Effect of Diet on Maternal EFA Index in the Cat

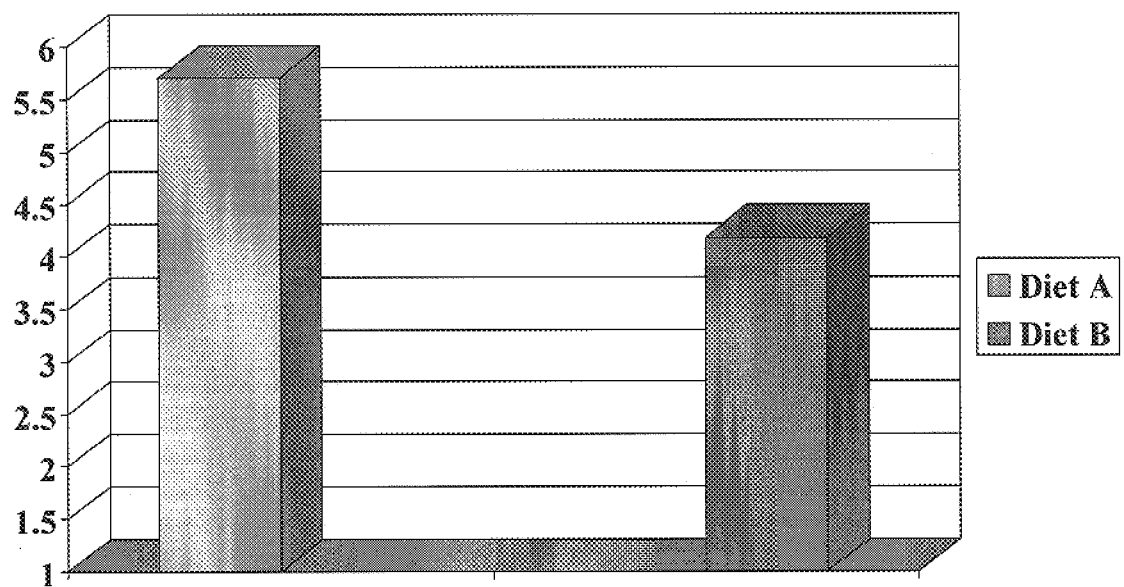
Figure 19. Effect of Diet on Number of Kittens Weaned

PROCESS FOR ENHANCING CANINE AND FELINE REPRODUCTIVE PERFORMANCE

CROSS REFERENCE TO RELATED APPLICATIONS

This application claims the benefit of U.S. provisional application Serial No. 60/167,282, filed Nov. 24, 1999.

BACKGROUND OF THE INVENTION

This invention relates to a process for enhancing canine and feline reproductive performance, and more particularly, to a diet for administration to companion animals such as dogs or cats during their reproductive years which includes beneficial amounts of essential fatty acids in a desired ratio to maintain proper essential fatty acid status and to enhance and maintain reproductive performance.

Reproductive performance (i.e., live litter size) in female dogs typically declines following the third parity. Nutrition has been consistently indicated as a contributing factor in bitch reproductive performance. However, the reference to nutrition has generally been restricted to vague recommendations that a high quality food with ample energy is sufficient for reproduction. Little effort has been directed towards defining "quality" or to distinguish sufficient diets from more comprehensive diets with regard to reproduction.

Cats have also been shown to exhibit a decline in reproductive performance in subsequent parities. A few studies in companion animals including the dog and cat have reported reproductive improvements due to the presence of trace minerals in the diet such as manganese, zinc and copper. However, the mechanism(s) of the effect remains unclear.

Accordingly, there is a need in the art for a method of providing proper nutrition to companion animals during their reproductive years to maintain reproductive performance.

SUMMARY OF THE INVENTION

The present invention addresses that need by providing a diet for companion animals such as dogs and cats containing an effective amount of essential fatty acids to maintain essential fatty acid status and to enhance and maintain reproductive performance.

By "essential fatty acid status", it is meant the relationship between omega-6 and omega-3 fatty acids relative to omega-7 and omega-9 fatty acids present in the animal. More specifically, the essential fatty acid status, or EFA index, represents the sum of omega-6 and omega-3 fatty acids divided by the sum of omega-7 and omega-9 fatty acids. It has been found that in dogs, with each subsequent parity, the essential fatty acid status of the bitch declines due to a depletion of selected omega-3 and omega-6 fatty acids. It has also been found that cats demonstrate a decline in essential fatty acid status with each subsequent parity.

By "enhanced reproductive performance", it is meant that overall reproductive performance, including increased live births and decreased still births is improved relative to reproductive performance observed with companion animals fed other diets.

In accordance with one aspect of the present invention, a process for enhancing reproductive performance in a companion animal is provided comprising feeding the animal a diet including omega-6 and omega-3 fatty acids, where the ratio of omega-6 to omega-3 fatty acids of from about 3.5:1 to about 12.5:1. The ratio of omega-6 to omega-3 fatty acids is more preferably, from about 5:1 to about 10:1, and most preferably, from about 5:1 to about 8:1.

It is preferred that at least fifteen percent of the total fatty acids in the diet are omega-6 fatty acids. It is also preferred that at least two percent of the total fatty acids in the dietary composition are omega-3 fatty acids. Preferably, the diet comprises from about 2.5 to 7.5% by weight omega-6 fatty acids and from about 0.3 to 1.5% by weight omega-3 fatty acids, on a dry matter basis.

Where the animal is a dog, the diet preferably comprises from about 22 to 44% by weight protein and about 10 to 30% by weight fat. More preferably, the diet comprises from about 25 to 35% by weight protein and about 15 to 25% by weight fat. Where the animal is a cat, the diet preferably comprises from about 30 to 45% by weight protein and about 10 to 30% by weight fat. More preferably, the diet comprises from about 32 to 42% by weight protein and from about 15 to 28% by weight fat.

When an animal is fed the diet of the present invention, it has been found that the decline in reproductive performance is attenuated in subsequent parities. It has also been found that animals fed the diet of the present invention maintained a better essential fatty acid status. In addition, the animals which exhibited a better essential fatty acid status also demonstrated improved reproductive performance, including an increased number of live births and increased number of neonates at weaning.

Accordingly, it is a feature of the invention to provide a diet for companion animals such as dogs and cats which maintains essential fatty acid status and attenuates the decline in reproductive performance by providing an effective amount of essential fatty acids in the proper ratio in the diet of the animal. This, and other features and advantages of the present invention, will become apparent from the following detailed description, accompanying drawings, and appended claims.

BRIEF DESCRIPTION OF THE DRAWINGS

FIG. 1 is a graph illustrating frequency occurrence for number of pups born;

FIG. 2 is a graph illustrating percentage of bitches experiencing a reduction or increase in litter size across parity;

FIG. 3 is a graph illustrating the overall frequency of pups born to dams fed Diets I, II and III;

FIG. 4 is a graph illustrating the frequency of pups born to dams fed Diet I;

FIG. 5 is a graph illustrating the frequency of pups born to dams fed Diet II;

FIG. 6 is a graph illustrating the frequency of pups born to dams fed Diet II;

FIG. 7 is a graph illustrating the percentage of colony decreasing in litter size vs. subsequent parity for dams fed Diets I, II and III;

FIG. 8 is a graph illustrating the effect of diet on age at first estrus for Diets I, II and FIG. 9 is a graph illustrating the effect of parity on feline litter size with regard to number born;

FIG. 10 is a graph illustrating the effect of parity on feline litter size with regard to number weaned;

FIG. 11 is a graph illustrating the effect of parity on feline litter weaning weight;

FIG. 12 is a graph illustrating the effect of parity on feline maternal EFA status;

FIG. 13 is a graph illustrating the effect of parity on docosahexaneoic acid content in maternal feline RBC membranes;

FIG. 14 is a graph illustrating the effect of parity on arachidonic acid content in maternal feline RBC membranes;

FIG. 15 is a graph illustrating the effect of parity on feline maternal CADI;

FIG. 16 is a graph illustrating the effect of parity on Total n−7 and n−9 content in maternal feline RBC membranes;

FIG. 17 is a graph illustrating the effect of parity on Meads' acid content in maternal feline RBC membranes;

FIG. 18 is a graph illustrating the effect of diet on maternal EFA index in the cat; and FIG. 19 is a graph illustrating the effect of diet on number of kittens weaned.

DETAILED DESCRIPTION OF THE PREFERRED EMBODIMENTS

The present invention provides a diet which enhances reproductive performance by providing an effective amount of essential fatty acids in the proper ratio in the animal's diet. It has been found that female dogs and cats experience a decline in essential fatty acid status during the reproductive process. It has also been found that the reduction in essential fatty acid status becomes more pronounced with each subsequent reproductive cycle (parity).

The diet of the present invention corrects this essential fatty acid deficiency by providing an effective amount of essential fatty acids in the proper ratio. Dogs which have been maintained on the diet of the present invention have been found to have increased litter size and a reduced number of misconceptions as compared with other commercially available diets.

The diet may be provided in the form of any suitable pet food composition which also provides adequate nutrition for the animal. For example, a typical canine diet for use in the present invention may contain from about 10 to 30% fat, and about 22 to 44% by weight protein. A typical feline diet may contain from about 10 to 30% by weight fat, and from about 30 to 45% by weight protein. However, no specific ratios or percentages of these or other nutrients are required.

In order that the invention may be more readily understood, reference is made to the following examples which are intended to illustrate the invention, but not limit the scope thereof.

EXAMPLE 1

In an effort to more clearly understand canine reproduction, a retrospective examination of historical data (1418 litters) was obtained from a commercial beagle breeder and subjected to statistical analysis. The primary diet was the colony house diet consisting of a commercial laboratory chow for dogs with an approximate matrix of 26% protein and 16% fat. The statistical model accounted for the main effects of year, season, panty, age and interaction thereof on litter size at birth. Age and parity effects could not be sufficiently separated due to management practices, thus age was dropped from the model. It should be noted that some dams had multiple observations across parity, therefore the effect of parity is somewhat confounded. To help account for this, dams were grouped by the number of observations and analyzed against parity with no differences detected. Regardless of these design imperfections, results indicate that dam parity number influences reproductive performance in the beagle.

Results

Findings are presented in Table 1 below. Significant differences are denoted by differing superscripts (P<0.05).

TABLE 1

| Parity Number | Number Born[1] | Number Born Alive[1] | Number of Still-Born[1] | % of Overall Average Number Born |
|---|---|---|---|---|
| Overall | 6.13 ± .05 | 6.09 ± .05 | 0.04 ± .01 | |
| 1 | 6.00 ± .07[a] | 5.95 ± .08[a] | 0.05 ± .02[ab] | 97.8 |
| 2 | 6.24 ± .10[b] | 6.22 ± .09[b] | 0.03 ± .03[a] | 101.8 |
| 3 | 6.39 ± .12[b] | 6.36 ± .12[b] | 0.10 ± .03[ab] | 104.2 |
| 4 | 6.19 ± .17[ab] | 6.10 ± .17[ab] | 0.13 ± .05[b] | 100.9 |
| 5 | 5.66 ± .28[a] | 5.61 ± .28[a] | 0.05 ± .07[ab] | 92.3 |

[1]LSMean ± SE

Colony Characteristics

In an effort to define the "typical litter size" for this colony, data were plotted based on occurrence frequency. "Typical" was defined so as to encompass the whole pup number of the colony mean±1 SD and "non-typical" as the remaining observations. These criteria allow for the population to have a wide range but still consider the physiological consequences of the situation. Results are shown in FIG. 1. The "typical litter" for this colony was found to range from 4 to 8 pups and accounted for more than 80% of all observations. Litters exceeding 8 pups were termed "large" (~8% of all observations) and litters of 3 or less were termed "small" (~7% of all observations). In addition, it was observed that ~75% of females that had large litters would give birth to a litter that was small or below average size (~4.5 pups/litter) in the subsequent parity. In contrast, females giving birth to small litters were found, ~70% of the time, to have large or above average size litters (>7.5 pups/litter) in their subsequent parity. These results can be interpreted as an indicator of overall maternal status (endocrine, nutritive reserves, etc.) which is indicative of the ability of the female to meet the demands of reproduction. Additional indications can be gained by examining how the colony itself responds to subsequent parities. A plot of the colony percentage experiencing a reduction or increase in litter size across parity is shown in FIG. 2. These data would address the stability of the colony with regard to litter size and parity. The presence of a population that contains some animals with increasing litter size and others with decreasing litter size could indicate an oscillating pattern associated with improved or reduced maternal status, respective to increased or decreased litter size.

Maternal body nutrient stores, including essential fatty acids, prior to conception is a contributing factor as to whether or not a female's litter size is larger or smaller compared to their previous litter. For example, one would expect those females with better nutrient stores at conception to produce a larger litter than females with reduced body status. Thus, the oscillating pattern of increasing and decreasing litter size could reflect the degree of nutrient depletion by the female's previous litter.

EXAMPLE 2

In an effort to determine the impact of maternal nutrition on canine reproduction, a historical database (16,032 litters) was obtained from a second commercial beagle facility. Facility management indicated that no changes in genetic selection or husbandry management, with the exception of diet, had occurred over the examined years of 1987 to 1998. The diet descriptions and years fed are detailed in Table 2. It should be noted that diet descriptions are approximate values as laboratory analyses were not performed at the time of feeding. Performance parameters, gestation length (GL), whelping interval (WI), age of first whelping, number born (NB), number born alive (NBA), number still-born (NBD), parity, season, misconception rate, effect on subsequent litter, and litter size frequency were examined for the overall colony and for each of the three diets. Due to the fact that contemporary diet groups were not available, analysis for year effect between diets was not possible. However, data were analyzed for the year(diet) effect. All litters not generated (breeding to whelping) from a single diet were eliminated, thus all litters produced within a diet classification were receiving that diet from conception forward. As in Example 1, there were dams that had multiple observations across parity, therefore the effect of parity is somewhat confounded. In addition, some dams were fed multiple diets at some point in their reproductive history. A separate analysis was performed on dams that received a single diet throughout their reproductive life in an attempt to account for this confounding.

TABLE 2

Approximate diet compositions and duration they were fed.

| Item | Diet I[2] 58 months | Diet II[2] 24 months | Diet III[2] 58 months |
|---|---|---|---|
| Protein %[1] | 28 | 31 | 31 |
| Fat %[1] | 21 | 20 | 20 |
| NFE %[1] | 39 | 32 | 34 |
| Ash %[1] | 7 | 7.5 | 6.5 |
| Moisture %[1] | 3.5 | 7.8 | 6.3 |
| Ca %[1] | 1.7 | 1.1 | 1.3 |
| P %[1] | 1.0 | 1.0 | 0.9 |
| Energy (kcal/kg)[1] | 5100 | 4900 | 5050 |
| DM Digestibility %[1] | 78 | 81 | 85 |
| w 6:3 Ratio | 20:1* | 20:1* | 5.0:1 |

*Estimated values based on average compositional values of ingredients on panel.
[1]Based on historical data (non-published) from similar matrices diet.
[2]Diet I = Bil Jac ®, available from Bil-Jac Foods, Diet II = Eukanuba ® Original, available from The Iams Company and Diet III = Eukanuba ® Premium Performance with Omega Coat ™, available from The Iams Company Results The following results are based on 16,032 litters from 17,116 matings with observations of 6587, 3858 and 5587 litters for Diets I, II and III, respectively. Analysis revealed no effect of season or year(diet) for any of the reproductive parameters examined. No significant influence of diet was detected for GL or WI, although the WI for Diet III tended to be slightly shorter. This slight reduction could be associated with a small reduction in misconception rate with Diet III (5.19%) compared to Diets I and II(7.58 & 8.69%, respectively). The average GL for the colony across all diets was 63.6±2.75 (range =59 to 67) days post breeding, with slightly longer GL (64.1±3.2) in smaller litters (≦4 pups) and slightly shorter GL (62.3±2.7) in larger litters (≧9 pups).

While no effect of diet was found for GL, a significant effect (P<0.03) on age at first whelping was detected with initial whelping at 1.05, 1.04 and 0.99 years of age for Diets I, II and III respectively. Although no significant diet effect on first parity misconception rate was found, there was a concern that first breeding misconceptions may be impacted differently by diet. Thus a second analysis, accounting for first breeding misconception, was performed. Results were similar to initial findings, with Diet III fed dams being significantly younger (−17 days) at first whelping when compared to dams fed Diets I and II. Parity results for NB, NBA and NBD are presented below in Table 3. Significant differences are denoted by different superscripts (P<0.05).

TABLE 3

Effect of parity on canine reproductive performance.

| Parity Number | Diet | Number Born[1] | Number Born Alive[1] | Number of Still-Born[1] |
|---|---|---|---|---|
| Overall | I | 6.73 ± .03[a] | 6.46 ± .03[a] | 0.27 ± .01[a] |
| Overall | II | 6.78 ± .04[a] | 6.53 ± .04[a] | 0.25 ± .01[a] |
| Overall | III | 6.95 ± .03[b] | 6.77 ± .03[b] | 0.17 ± .01[b] |
| 1 | I | 6.33 ± .05[a] | 6.03 ± .05[a] | 0.29 ± .015[a] |
| 1 | II | 6.78 ± .09[c] | 6.56 ± .09[b] | 0.22 ± .030[b] |
| 1 | III | 6.58 ± .07[b] | 6.43 ± .07[b] | 0.15 ± .022[c] |
| 2 | I | 6.79 ± .06 | 6.58 ± .06[a] | 0.21 ± .015[a] |
| 2 | II | 6.87 ± .09 | 6.71 ± .09[ab] | 0.15 ± .024[b] |
| 2 | III | 6.90 ± .07 | 6.77 ± .03[b] | 0.13 ± .020[b] |
| 3 | I | 7.14 ± .06 | 6.94 ± .06 | 0.21 ± .015[a] |
| 3 | II | 7.32 ± .09 | 7.13 ± .09 | 0.19 ± .022[a] |
| 3 | III | 7.22 ± .07 | 7.11 ± .07 | 0.11 ± .017[b] |
| 4 | I | 7.02 ± .07[a] | 6.79 ± .07[a] | 0.23 ± .018[a] |
| 4 | II | 7.08 ± .09[a] | 6.88 ± .09[a] | 0.21 ± .024[a] |
| 4 | III | 7.31 ± .07[b] | 7.16 ± .07[b] | 0.15 ± .017[b] |
| 5 | I | 6.78 ± .08[a] | 6.42 ± .08[a] | 0.36 ± .030[a] |
| 5 | II | 6.75 ± .10[a] | 6.41 ± .11[a] | 0.35 ± .037[a] |
| 5 | III | 6.92 ± .07[a] | 6.70 ± .07[b] | 0.21 ± .025[b] |
| 6 | I | 6.39 ± .11[a] | 6.05 ± .11[a] | 0.33 ± .031[a] |
| 6 | II | 6.25 ± .13[a] | 5.93 ± .13[a] | 0.33 ± .037[a] |
| 6 | III | 6.75 ± .10[b] | 6.52 ± .10[b] | 0.23 ± .028[b] |
| 7 | I | 6.03 ± .15[a] | 5.78 ± .16[a] | 0.46 ± .058[a] |
| 7 | II | 5.85 ± .14[a] | 5.41 ± .14[a] | 0.44 ± .053[a] |
| 7 | III | 6.35 ± .13[b] | 6.12 ± .13[b] | 0.22 ± .048[b] |
| 8 | I | 5.58 ± .25 | 5.16 ± .25 | 0.41 ± .018[a] |
| 8 | II | 5.61 ± .14 | 5.36 ± .14 | 0.25 ± .024[b] |
| 8 | III | 5.87 ± .18 | 5.58 ± .18 | 0.29 ± .017[b] |
| 9 | I | 4.24 ± .49[a] | 3.88 ± .48[a] | 0.36 ± .018 |
| 9 | II | 5.38 ± .17[a] | 5.13 ± .17[b] | 0.25 ± .024 |
| 9 | III | 5.54 ± .25[b] | 5.23 ± .25[b] | 0.30 ± .017 |

[1]LSMean ± SE.

Regardless of diet, parity influences dam performance with an initial increase followed by a steady decline in NB and NBA as parity number advances. These findings for Diets I and II are similar in pattern to results demonstrated with the data presented in Example 1, with reproductive performance decreasing after the third parity. In contrast, dams being fed Diet II do not decline in NB and NBA until after the fourth litter. All diets were found to be similar in NB for parities 2 and 3, with Diet II having increased live births in parity 2 when compared to Diet 1. Stillborn number was significantly reduced in dams fed Diet III during all parities except parity 9 when compared to dams fed Diet I and parities 1, 8 and 9 when compared to dams fed Diet II. As noted earlier, some dams during their reproductive lives consumed two or three of these diets. If only single diets animals are included in the analysis, overall (parity 1–6) performance values for dams fed Diet III are further exaggerated with a 0.62 increase in NB, a 0.84 increase in NBA and a 0. 12 decrease in NBD when compared to Diet I. Diet II was not included in this analysis due to limited number of animals fed exclusively Diet II beyond 3 parities.

Colony Characteristics

The frequency occurrence, reported as percentage of colony births, for the diets are shown in FIGS. 3–6 (FIG. 3 illustrates an overall frequency plot of pups born to dams across all diets, while FIGS. 4–6 illustrate the frequency plot for pups born to dams fed each of diets I, II and III). While the colony in Example 2 is clearly a superior colony when compared to the colony in Example 1, there is also a small plot shift to the right due to diet for the colony in Example 2. Across all diets, the frequency plots for this colony (Example 2) suggest that the "typical" litter for Example 2 would range from 4 to 9 pups, with litters of ≧10 being termed "large" and ≦3 being termed "small". However, when examined comparatively, there is a definite right shift in the pattern for dams fed Diet III, with greater than 40% of all litters containing ≧8 pups compared to approximately 35% of Diets I and II. Similar results were observed when examined for NBA, with ~40% of Diet II fed dams giving birth to 8 or more pups compared to Diet I and II fed dams at 31 and 33%, respectively.

Whelping interval for the colony was found to average 221±35 days, with no effect of diet. Because of colony management practice, whelping interval and misconception occurrence were highly correlated. However, based on analysis, data suggests a dietary influence on misconception rate with dams experiencing a misconception 1 per 13 and 1 per 12 matings for Diet I and II verses 1 per 20 matings for Diet III. To determine the effect of whelping interval on litter size, litter size from the second parity forward following the occurrence of a misconception was examined. This criteria accounted for greater than 93% of observations with a whelping interval of ≧280 d. Data was expressed as a percentage of the overall parity average for a single dam. Dams fed Diets I and II were found to have litters of approximately 127 and 124% of their average following a misconception compared to 111% with dams fed Diet III. Although some genetic differences must be considered, these results imply that maternal status derived from the Diet III matrix was improved or maintained at a higher level when compared to the other diet matrices. This is further supported when one considers the percentage of the colony declining in litter size across parity (FIG. 7). A note of interest concerning this data is the increase (+12%) in the colony percentage experiencing litter size declines in dams fed Diet I compared to Diet III. It should be noted that parity 4 data for Diet II is based on less than 200 animals and Diet II parity 5 data was eliminated due to insufficient numbers. These observations are based on animals fed a single diet for their entire reproductive life.

Overall, there is a clear effect of parity on litter size (NB, NBA and NBD) with performance initially increasing followed by a steady decline after 3 parities with Diets I & II and following the fourth parity with Diet III. Additionally, while the possibility of other contributing factors cannot be discounted, the data demonstrated an effect of diet on litter size (NB, NBA and NBD) with a right shift (improvement) of the Diet III fed dam's frequency plot when compared to dams fed Diets I and II. Data also suggest that diet could induce slight reductions in misconception rate. These observations, when combined with the diet associated decrease in age at first whelping, demonstrate that dietary matrix can influence the reproductive process in the bitch with Diet III being superior.

In the study described in Example 1, data was presented that demonstrated the effect of parity and subsequent parity on bitch productivity, although no nutritional component was evaluated. This colony was managed under similar conditions as the colony in the study described in Example 2 with regard to husbandry, genetic selection, and breeding intensity. The primary diet of this colony was a laboratory canine matrix composed of 25% protein (animal and plant proteins) and 16% fat with an approximate dry matter (DM) digestibility of 75% for the total diet. As described above in Table 2, the diets fed during the study of Example 2 were composed of: Diet I—28% protein (primarily meat based) and 21% fat; Diets II and III—31% protein (primarily meat based) and 20% fat. Additional dietary differences include an increased omega-3 fatty acid content of Diet III resulting in an omega-6:3 ratio of ~5:1 when compared to the other diets (~20:1). This would thus allow for comparisons to be made on the impact of dietary energy (Fat%) and omega-3 fatty acids on canine reproduction. To assist with clarification, dams will be referred to from this point forward as group A (Example 1), B (Diet I; Example 2), C (Diet II; Example 2) and D (Diet III; Example 2).

All groups were found to be affected by parity, with groups A, B and C demonstrating declining reproductive performance after 3 litters and group D declining following the 4$^{th}$ parity. Group A was found to have the lowest productivity with regard to litter size (NB and NBA) followed by group B and C, with group D producing the largest litters (6.13 vs 6.73 vs 6.77 vs 6.95, respective to group). Litter size frequency plot comparisons support these findings with the "typical" litter being defined as 4–8 pups for group A compared to 4–9 pups for groups B and C with group D having a transitional "typical" litter of 5–10 pups. These comparisons indicate that a slight increase in dietary protein and/or fat concentrations can enhance litter size. This is further supported by the trend for increased litter size for group C when compared to group B. Although these diets were very similar in energy content, the diet fed to group B was estimated to be slightly higher in DM digestibility (81 vs 78%). Group D was found to have enhanced reproductive performance as indicated by improved NB, NBA, subsequent litter shifts, reduced NBD, reduced misconceptions (non-significant) and reduced age at first whelping. In part, these differences could be due to the improved DM digestibility of their diet (85% vs 78 and 81 % for groups D, B and C respectively). However, given the magnitude of difference seen with group D relative to the others, it is apparent that dietary omega-3 fatty acids are a major contributor to reproductive effectiveness in the bitch. Certainly, diet quality could play an important role and a lower quality diet would less effectively meet the needs of the bitch, but this can be somewhat compensated by increased intake. Essential fatty acid status, however, cannot be compensated for through adjustments in intake volume if the fatty acid ratio of the diet is not correct. The observed increase in NB and decrease in NBD in dams fed increased dietary omega-3 fatty acids indicate an influence of both a maternal and neonatal essential fatty acid status on canine reproduction.

The study in Example 2 indicates the role of the dietary omega-3 fatty acid in canine reproduction. Data demonstrated that dams in Group D (Example 2) with an omega-6:3 ratio of ~5:1 produced larger litters (increased number born and number born alive with declined number of stillborns) than did other diets of a similar matrix with a omega-6:3 ratio of ~20:1. Additionally, dams receiving the diet with the adjusted omega-6:3 ratio tended to have fewer misconceptions, a right shift (improvement) in litter size frequency and were less susceptible to the effect of previous litter than did dams receiving diets lacking the omega-6:3 adjustment.

FIG. 8 illustrates the effect of diet on the age of first estrus. As can be seen, dams receiving Diet III are younger in age at the first estrus.

EXAMPLE 3

In an effort to obtain better insight into the physiological role of omega-3 fatty acids on canine reproduction, a study was designed to determine the effect of parity on cellular membrane lipid profiles of lactating bitches from various parities. Dams (n=96) were randomly selected from a commercial beagle facility and ranged in parity from 1 to 5

(n=20 for parities 1–4; n=16 for parity 5). All dams were fed an identical diet and were managed under similar conditions throughout their reproductive lives. Dams were evaluated for number born (NB), number born alive (NBA), number born dead (NBD), pup birth weight and fatty acid profiles of plasma and red blood cell (RBC) membrane. Additionally, dams were evaluated for historical reproductive performance to determine any possible group(parity) differences.

Results

No differences were detected between groups for any given parity. Overall, the randomly selected females appear to be representative of the colony predictions (obtained with previous analysis in Example 2) with regard to reproductive performance (see Table 4 below) across parity. Also, bitches were found to be affected by subsequent litters similar to previous colony analysis. This would indicate a stable genetic base for the colony, thus lessening any concerns about comparisons across parity.

TABLE 4

Reproductive performance of selected dams compared to colony.

| | Number Born[1] | Number Born Alive[1] | Number Born Dead[1] | Number Weaned[1] |
|---|---|---|---|---|
| (Example 2) | | | | |
| Overall | 6.99 ± .03 | 6.84 ± .03 | 0.15 ± .01 | ND* |
| Parity 1 | 6.58 ± .07[a] | 6.43 ± .07[a] | 0.15 ± .02[a] | ND* |
| Parity 2 | 6.90 ± .03[b] | 6.77 ± .03[b] | 0.13 ± .01[a] | ND* |
| Parity 3 | 7.22 ± .07[c] | 7.11 ± .07[c] | 0.11 ± .01[b] | ND* |
| Parity 4 | 7.31 ± .07[c] | 7.16 ± .07[c] | 0.15 ± .02[a] | ND* |
| Parity 5 | 6.92 ± .07[b] | 6.70 ± .07[b] | 0.21 ± .03[c] | ND* |

TABLE 4-continued

Reproductive performance of selected dams compared to colony.

| | Number Born[1] | Number Born Alive[1] | Number Born Dead[1] | Number Weaned[1] |
|---|---|---|---|---|
| (Example 3) | | | | |
| Overall | 7.00 ± .11 | 6.85 ± .11 | 0.15 ± .02 | 6.44 ± .11 |
| Parity 1 | 6.69 ± .20[a] | 6.44 ± .19[a] | 0.24 ± .04[a] | 6.00 ± .19[a] |
| Parity 2 | 6.63 ± .22[a] | 6.52 ± .21[a] | 0.11 ± .05[b] | 6.18 ± .21[a] |
| Parity 3 | 7.39 ± .25[b] | 7.31 ± .24[b] | 0.07 ± .05[b] | 6.90 ± .24[b] |
| Parity 4 | 7.55 ± .30[b] | 7.45 ± .29[b] | 0.11 ± .06[b] | 7.00 ± .29[b] |
| Parity 5 | 7.52 ± .40[b] | 7.41 ± .38[b] | 0.11 ± .08[b] | 6.88 ± .38[b] |

[1]LSMean ± SE
*Not Determined
Different superscripts denote a significant difference (P < .05).

Fatty acid profiles of RBC membranes and plasma were determined using methyl-ester derivatization followed by gas chromatography with flame iodinization detection. Procedures utilized were modifications of Outen et al., (1976). Briefly, 200 mg samples containing internal standards were freeze-dried (Hetovac VR-1, ATR, Laurel, Md.). Following freeze-drying, samples were subjected to trans-esterification with 3 ml of a 10% boron-triflouride in methanol. Samples were reacted for 50 min. at 105° C. Fatty acid methyl esters (FAMES) were extracted with 1 ml of a 50:50 mixture of hexane and ethyl ether. Extracted FAMES were transferred to an autosampler and injected onto a Varian 3500 Gas Chromatograph fitted with a DB-23 column (J&W Scientific, Folsom, Calif.) for separation. Findings of statistical analysis are presented below in Tables 5 (LSMeans±SE) and 6 (Parity and Litter Size Correlations).

TABLE 5

Fatty acid[profiles1] (mg/g) of RBC membrane and plasma separated by parity.

| Fatty Acid Symbol/Name | Tissue[2] Type | Parity 1* | Parity 2* | Parity 3* | Parity 4* | Parity 5* |
|---|---|---|---|---|---|---|
| 16:0 Palmitic | M P | 287.32 ± 3.11[a] 478.5 ± 8.00[a] | 287.39 ± 3.12[a] 476.12 ± 7.94[a] | 270.25 ± 3.11[b] 452.21 ± 7.92[b] | 274.50 ± 3.24[b] 458.13 ± 7.93[b] | 275.55 ± 3.50[b] 453.40 ± 8.96[b] |
| 17:0 Margaric | M P | 5.43 ± 0.09[a] 9.75 ± 0.18[a] | 5.25 ± 0.09[a] 9.45 ± 0.18[a] | 4.94 ± 0.09[b] 9.25 ± 0.18[ab] | 4.80 ± 0.10[b] 9.14 ± 0.18[b] | 4.97 ± 0.10[b] 9.30 ± 0.20[ab] |
| 18:0 Stearic | M P | 329.83 ± 4.18[a] 425.56 ± 6.61[ab] | 326.39 ± 4.20[a] 418.74 ± 6.56[ab] | 321.24 ± 4.19[ab] 432.67 ± 6.54[a] | 313.73 ± 4.35[b] 410.60 ± 6.54[b] | 313.88 ± 4.71[b] 421.43 ± 7.40[ab] |
| 18:1n-9 Oleic | M P | 151.38 ± 2.27[a] 416.23 ± 10.21 | 152.16 ± 2.29[a] 414.92 ± 10.12 | 142.97 ± 2.28[b] 393.54 ± 10.10 | 150.78 ± 2.37[a] 393.91 ± 10.10 | 150.70 ± 2.57[a] 393.96 ± 11.42 |
| 18:2n-6 Linoleic | M[3] P | 170.66 ± 3.63[a] 758.29 ± 9.98[a] | 168.74 ± 3.65[ab] 747.22 ± 9.90[ab] | 157.36 ± 3.64[c] 729.83 ± 9.87[b] | 157.27 ± 3.78[c] 741.60 ± 9.88[ab] | 160.07 ± 4.10[b] 728.25 ± 11.17[b] |
| 18:3n-6 γ-Linolenic | M P | 0.45 ± 0.14[a] 11.38 ± 0.36 | 0.28 ± 0.14[a] 11.36 ± 0.36 | 0.55 ± 0.14[ab] 10.59 ± 0.36 | 0.87 ± 0.14[b] 11.06 ± 0.36 | 0.38 ± 0.16[a] 10.89 ± 0.40 |
| 18:3n-3 α-Linolenic | M[3] P[3] | 2.13 ± 0.18[a] 11.72 ± 0.44[a] | 1.87 ± 0.18[ab] 11.01 ± 0.44[a] | 1.78 ± 0.18[ab] 9.65 ± 0.44[b] | 1.71 ± 0.19[b] 9.70 ± 0.44[b] | 1.51 ± 0.21[b] 9.27 ± 0.50[b] |
| 20:3n-9 Mead's | M[3] P | 2.75 ± 0.18[a] 18.18 ± 1.67[a] | 3.11 ± 0.19[ab] 16.85 ± 1.65[a] | 2.99 ± 0.18[ab] 16.59 ± 1.65[ab] | 3.36 ± 0.19[b] 15.66 ± 1.65[ab] | 3.36 ± 0.21[b] 11.73 ± 1.86[b] |
| 20:3n-6 Dihomo-γ Linolenic | M[3] P | 29.00 ± 0.95 34.78 ± 2.04 | 29.88 ± 0.95 31.89 ± 2.02 | 28.13 ± 0.95 36.87 ± 2.02 | 31.33 ± 0.99 35.88 ± 2.02 | 31.37 ± 1.07 36.28 ± 2.28 |
| 20:4n-6 Arachidonic | M[3] P | 362.07 ± 4.91[a] 308.95 ± 10.98 | 347.76 ± 4.94[b] 304.47 ± 10.88 | 343.39 ± 4.92[bc] 319.54 ± 10.86 | 333.07 ± 5.12[cd] 299.37 ± 10.86 | 328.41 ± 5.54[d] 311.03 ± 12.28 |
| 20:5n-3 Eicosapentaenoic | M P | 21.96 ± 0.70[a] 68.00 ± 2.20 | 21.73 ± 0.71[a] 67.21 ± 2.18 | 19.78 ± 0.71[b] 64.62 ± 2.17 | 20.85 ± 0.73[a] 68.45 ± 2.17 | 20.33 ± 0.80[a] 65.66 ± 2.46 |
| 22:5n-3 Docosapentaenoic | M[3] P | 15.15 ± 33[a] 49.98 ± 2.58 | 14.80 ± 0.33[ab] 51.46 ± 2.56 | 13.97 ± 0.33[bc] 51.77 ± 2.55 | 13.63 ± 0.34[c] 46.42 ± 2.56 | 13.52 ± 0.37[c] 49.65 ± 2.89 |
| 22:6n-3 Docosahexaenoic | M[3] P | 19.38 ± 0.53[a] 55.87 ± 2.49 | 18.09 ± 0.53[ab] 52.94 ± 2.47 | 18.34 ± 0.53[a] 58.50 ± 2.46 | 17.41 ± 0.55[b] 52.57 ± 2.46 | 16.73 ± 0.60[b] 56.72 ± 2.78 |

TABLE 5-continued

Fatty acid[profiles1] (mg/g) of RBC membrane and plasma separated by parity.

| Fatty Acid Symbol/Name | Tissue[2] Type | Parity 1* | Parity 2* | Parity 3* | Parity 4* | Parity 5* |
|---|---|---|---|---|---|---|
| Saturated | M[3] | 647.65 ± 4.80[a] | 645.22 ± 4.83[a] | 623.17 ± 4.81[b] | 620.42 ± 5.00[b] | 621.52 ± 5.42[b] |
| | P[3] | 939.01 ± 6.49[a] | 929.29 ± 6.43[ab] | 918.18 ± 6.42[bc] | 902.10 ± 6.42[bc] | 909.38 ± 7.26[c] |
| Mono-unsaturated | M[3] | 282.97 ± 2.83[a] | 288.71 ± 2.84[ab] | 280.73 ± 2.83[a] | 291.60 ± 2.95[b] | 290.47 ± 3.19[b] |
| | P | 583.35 ± 12.42 | 586.79 ± 12.31 | 563.89 ± 12.29 | 560.22 ± 12.29 | 564.93 ± 13.90 |
| Poly-unsaturated | M[3] | 630.93 ± 6.36[a] | 612.66 ± 6.40[b] | 594.12 ± 6.37[c] | 587.59 ± 6.63[c] | 582.78 ± 7.17[c] |
| | P[3] | 1334.0 ± 11.9[a] | 1310.3 ± 11.8[ab] | 1314.4 ± 11.7[ab] | 1298.2 ± 11.73[b] | 1298.7 ± 13.3[b] |
| Omega 3 | M[3] | 59.08 ± 1.18[a] | 56.59 ± 1.19[ab] | 54.78 ± 1.18[b] | 52.70 ± 1.23[b] | 52.17 ± 1.33[b] |
| | P | 187.88 ± 4.35 | 183.84 ± 4.31 | 186.35 ± 4.30 | 179.38 ± 4.30 | 183.33 ± 4.69 |
| Omega 6 | M[3] | 569.04 ± 7.34[a] | 550.42 ± 7.38[ab] | 534.99 ± 7.35[bc] | 519.94 ± 7.65[c] | 523.92 ± 8.28[c] |
| | P | 1125.3 ± 10.9 | 1107.4 ± 10.9 | 1108.9 ± 10.8 | 1100.7 ± 10.8 | 1101.7 ± 12.3 |
| Omega 7 | M | 55.01 ± 1.03[ab] | 56.95 ± 1.04[a] | 53.95 ± 1.04[b] | 56.50 ± 1.08[ab] | 56.24 ± 1.17[ab] |
| | P | 144.74 ± 3.34 | 149.68 ± 3.32 | 147.24 ± 3.31 | 143.02 ± 3.31 | 147.51 ± 3.74 |
| Omega 9 | M[3] | 228.44 ± 2.26[a] | 232.47 ± 2.27[ab] | 227.13 ± 2.26[a] | 236.15 ± 2.35[b] | 235.73 ± 2.55[b] |
| | P | 448.17 ± 10.17 | 445.83 ± 10.08 | 424.93 ± 10.06 | 424.60 ± 10.06 | 420.65 ± 11.38 |
| 6 To 3 Ratio | M[3] | 9.67 ± 0.16[a] | 9.76 ± 0.16[ab] | 9.80 ± 0.16[ab] | 9.87 ± 0.16[ab] | 10.13 ± 0.18[b] |
| | P | 6.02 ± 0.16 | 6.04 ± 0.16 | 5.92 ± 0.16 | 6.14 ± 0.16 | 6.07 ± 0.18 |
| EFA Index (Σw6&3/Σw7&9) | M[3] | 2.21 ± 0.03[a] | 2.12 ± 0.03[b] | 2.12 ± 0.03[b] | 2.00 ± 0.03[c] | 1.98 ± 0.03[c] |
| | P | 2.20 ± 0.06 | 2.18 ± 0.06 | 2.26 ± 0.06 | 2.27 ± 0.06 | 2.25 ± 0.07 |

[1]Expressed as mg of fatty acid/g of lipid; [2]M = RBC membrane; P = Plasma; *LSMeans ± SE, different superscripts denote statistical difference; [3]Significant linear effect.

TABLE 6

Correlation[a] of membrane fatty acids to increasing parity and litter size (NB).

| Fatty Acid Symbol/Name | Relationship to Parity | Probability | Relationship to Litter Size | Probability |
|---|---|---|---|---|
| 18:1n-9 Oleic | 0.021 | 0.84 | 0.165 | 0.11 |
| 18:2n-6 Linoleic | −0.126 | 0.22 | −.028 | 0.79 |
| 18:3n-6 γ-Linolenic | 0.123 | 0.23 | 0.027 | 0.79 |
| 18:3n-3 α-Linolenic | −0.206 | 0.05 | 0.022 | 0.83 |
| 20:3n-9 Mead's | 0.225 | 0.03 | 0.209 | 0.04 |
| 20:3n-6 Dihomo-γ Linolenic | 0.170 | 0.10 | 0.250 | 0.02 |
| 20:4n-6 Arachidonic | −0.191 | 0.06 | −0.103 | 0.32 |
| 20:5n-3 Eicosapentaenoic | −0.097 | 0.35 | 0.106 | 0.30 |
| 22:5n-3 Docosapentaenoic | −0.226 | 0.03 | −0.263 | 0.01 |
| 22:6n-3 Docosahexaenoic | −0.201 | 0.05 | −0.256 | 0.02 |
| Saturated | −0.076 | 0.46 | −0.020 | 0.85 |
| Monounsaturated | 0.101 | 0.33 | 0.175 | 0.09 |
| Polyunsaturated | −0.152 | 0.14 | −0.054 | 0.60 |
| Omega 3 | −0.260 | 0.02 | −0.188 | .06 |
| Omega 6 | −0.197 | .05 | −0.078 | 0.45 |
| Omega 7 | 0.071 | 0.49 | 0.100 | 0.33 |
| Omega 9 | 0.115 | 0.27 | 0.201 | .05 |
| 6 To 3 Ratio | 0.185 | 0.07 | 0.276 | .01 |
| EFA Index (Σw6&3/Σw7&9) | −0.517 | .01 | −0.503 | .01 |

[a]Significant correlation denoted by bold print.

Discussion

While no data for normal values was presented above in Tables 5 or 6, the lipid profiles (membrane and plasma) from ten nulliparous, non-gestating bitches were determined, which were classified as normal canine values. Nulliparous bitches were found to have a significantly better EFA index (2.37) with higher (P<0.05) essential fatty acids (omega-6 and 3) and lower (P<0.05) nonessential fatty acids (omega-7 and 9) when compared any parity group. Findings from this study demonstrate that the bitch suffers a decline in EFA status during the reproductive process. It was also demonstrated that increased demand additionally reduces the maternal EFA status as evident by the significant negative correlation ($r^2$−0.503; P<0.01) between litter size and EFA status. Additionally, findings from this study demonstrate that a reduction in EFA status by repetitive reproductive bouts in the bitch becomes more substantial with each progressive parity ($r^2$−0.517; P<0.01). When compared to the nulliparous bitches, reductions of 6.75, 10.55, 10.55, 15.61 and 16.46% in the EFA index with respect to parities 1 through 5 were observed. This reduction arises from significant linear (P<0.05) reductions in both omega-6 and omega-3 fatty acids such as linoleic acid, α-linolenic acid, AA, docosapentaenoic acid and docosahexaneoic acid (DHA). Other indicators of EFA stress were the numerical increases in omega-7 and omega-9 fatty acids, including the linear increase (P<0.05) of Mead's Acid (20:3n-9). As mentioned earlier, a significant negative correlation of EFA status and litter size was demonstrated. Due to lack of physical numbers, it was not possible to fully account for the parity litter size interaction. However, if litter size was classified as small (<4 pups), small average (4–5 pups), average (6–7 pups), large average (8–9 pups) and large (>9 pups), dramatic discrepancies within parities 3, 4 and 5 when separated by litter size, particularly for the 4th and 5th parities were observed. Although not subjected to statistical analysis, the average reduction for large average and large litters were 14 and 19% greater than small litters in parity 4 and 17 and 24% greater in parity 5. It is believed that this is the first data to demonstrate that not only does reproductive activity in the bitch reduce the EFA status, but also that repetitive reproductive activity enhances the degree of reduction. Based on these collective findings, it can be concluded that maternal dietary supply of EFA, both during and prior to (body stores) can influences the reproductive productivity.

MMP Data

Additional indications of reduced maternal EFA status in the bitch can be noted from the increased membrane mean melting points (MMP) of RBC with increased parities. The MMP values are derived based on the relative amount and the melting temperature of each FA present in the membranes. Similar to the EFA Index, the MMP was found to be significantly influenced by both parity and litter size. In the lactating bitch, MMP values were found to increase in a linear fashion (P<0.01) with regard to parity. The effect of litter size appears to be more additive in nature with the degree of MMP increase being highly dependent upon the dam's parity, with the greatest increase occurring in $\geq 3^{rd}$ parity bitches with above average litters. Increases in the MMP value would indicate a reduction in membrane fluidity, suggesting reduced overall cellular functionality.

EXAMPLE 4

In an effort to obtain insight into the effect of reproduction on feline maternal EFA status, a study was designed to examine queen EFA status as affected by parity and litter size. Queens (n=132) were randomly selected from a commercial breeding facility and ranged in parity from 0 to 6 (n=20, 20, 19, 22, 22, 21 and 8 respective to increasing parity). All queens were supplied a standard diet (not balanced for fatty acids) and managed under similar conditions. Queens were evaluated for litter size born (NB), litter size weaned (NW), and individual kitten weights. To determine maternal EFA status, FAP of both plasma and RBC membranes were determined on whole blood samples obtained between d 24 and 30 post-parturition. Whole blood samples were collected in Vacutaine®5 ml Hematology tubes (EDTA) and shipped overnight on wet ice. Following centrifugation (2700 RPM for 7 min), plasma was transferred to cryo-tubes and stored at −70° C. The buffer layer was then removed from atop the packed RBC and discarded. Packed RBC were subjected to hypo-tonic saline to induce cellular disruption. Samples were centrifuged (14,500 ×g for 20 min), the supernatant discarded and membrane pellet transfer to cryo-tubes and stored at −70° C. Fatty acid profiles of samples were determined using procedures described in Example 3.

Results

Overall Reproduction: Litter size in the queen was found to be quadratic (P<0.01) with regard to NB. Second parity queens were found to have significantly (P<0.01) larger litters than did first parity queens, 5.77 vs 5.11 kittens/litter (see FIG. 9 ). Queens greater than parity 2 were found to decline linearly with regard to number born (5.19, 5.03, 4.64 and 4.43 respective to parity 3, 4, 5, and 6). Similar results were observed for number weaned (see FIG. 10). Kitten weaning weight was found to decline linearly (P<0.03) with regard to parity (see FIG. 11).

Essential Fatty Acid Status: Overall maternal EFA status was observed to decline in a quadratic (P<0.01) manner. Nulliparous (Parity 0) queens were found to have the highest EFA index at 2.23 (see FIG. 12) while all reproductively active queens, regardless of parity, had lower EFA index rankings than did nulliparous queens. Relative to the nulliparous queens, reductions of 7 to 16% were observed for reproductively active queens (see FIG. 12). Queen EFA index appeared to be influenced by both parity and litter size, with greater reductions observed for queens with larger litters within parity.

Maternal total n–3 fatty acid status, while not significant, demonstrated a similar numerical decline similar to maternal EFA status. However, while total n–3 fatty acid levels were not dramatically influenced, maternal docosahexaneoic acid (DHA) levels were significantly (P<0.01) reduced in nursing queens when compared to nulliparous females (see FIG. 13). Similar results were noted for maternal total n–6 fatty acids and arachidonic acid (AA) levels with reproductively active queens possessing between 88% and 82% (respectively) of nulliparous females (see FIG. 14). Additional indications of reduced maternal EFA status are evident based on maternal reductions in both the cervonic acid sufficiency index (CASI) and cervonic acid deficiency index (CADI). The CASI is the relative ratio between cervonic acid (DHA: 22:6n–3) and osbond acid (22:5n–6). The CADI is the ratio between osbond acid (22:5n–6) and its precursor adrenic acid (22:4n–6). Compared to nulliparous females, queens from all parities had reduced (>20%) CASI (P<0.01). The CADI was found to increase in a linearly (P<0.01) fashion as parity increased (see FIG. 15), with parity 6 queens being almost 50% higher in the CADI than the nulliparous females. The reduction in CASI and the increase in CADI further support of the demands for n–3 fatty acid during reproduction, particularly DHA.

Maternal RBC membrane n–7 and n–9 fatty acids were found to increase in a quadratic manner (P<0.02) with regard to parity (see FIG. 16). Mead's acid (20:3n–9) was found to have a similar pattern with parity 6 queens having an approximately 44% increase relative to nulliparous females (see FIG. 17). These increases are extremely relevant since increases in these fatty acid families are associated with EFA deficiency.

Collectively these data suggest that reproductive activity in the queen increases EFA requirement to levels beyond what is being supplied in the typical cat food. This is particularly relevant, since some commercially available formulas place a high emphasis on dietary n–6 fatty acids, which could possibly further increase the level of decline of the n–3 fatty acids such as DHA by competitively reducing the n–3 EFA elongation and desaturation pathways. Based on information obtained in the bitch (see example 3), it is reasonable to conclude that feeding reproductively active queens a dietary matrix that has been balanced to supply both n–6 and n–3 at a ratio ranging from 5:1 and 10:1 would be beneficial to the reproductive process, particularly when a portion of these n–3 and n–6 EDFA are DHA and AA.

EXAMPLE 5

To further investigate the dietary effect on maternal essential fatty acid (EFA) status and reproduction in felines, a study was conducted comparing two diets, A and B. Test diets were similar in gross composition with each containing 36% protein and 23% fat; however they differed dramatically with regard to their fatty acid profile. Diet A was formulated to supply a balanced intake of both omega-6 (n6) and omega-3 (n3) fatty acids, containing 4.2% n6 and 0.6% n3 fatty acids by weight for a n6:n3 ratio of 7.3:1. Diet B was formulated to contain a similar level of n6 fatty acids (4.3% by weight), but was not balanced for n3 fatty acids (0.26% n3 fatty acids by weight) with a n6:n3 ratio of 16.3:1. Queens (10) fed a common adult maintenance diet were divided into two groups (5/diet; matched for parity), sampled for whole blood, and transitioned onto their respective test diets. Queens were allowed to consume their test diet at least 45 days prior to exposure to the male. Following breeding, pregnancy was confirmed at 21 days post breeding (G21) via palpation and ultrasound. Upon confirmation of pregnancy, blood samples were collected from the queen for EFA status determination.

Additional blood samples for EFA status determination were collected at G49, Parturition +2 days (P2), P14, P28, P56 and P84. All blood samples were processed and analyzed as previously described in Example 3. Treatment groups were found not to differ in EFA status prior to diet transition. However by G21, queens fed Diet A were found to have significantly higher (i.e. improved) EFA Index ratings (2.88 vs 2.60; FIG. 18). A similar difference between treatment groups was observed throughout the reproductive process, with the exception of P56 (Weaning), with Diet A queens having higher EFA Index ratings when compared to queens fed Diet B (FIG. 18). The improved maintenance of maternal EFA status by Diet A is even more impressive considering that Diet A fed queens also demonstrated superior reproductive performance when compared to Diet B fed queens (FIG. 19). In addition, queens fed Diet A were able to recover from the nutrient demands of reproduction as evident by the increased EFA Index rating at day P84 (2.69) compared to P56 (2.47) of the queens fed Diet A. In contrast, queens fed Diet B were found to have similar EFA Index ratings at day P84 (2.45) as was observed at P56 (2.45), indicating little or no nutrient repletion. These data offer definitive support for the importance of supplying a dietary matrix that contains the proper level and balance of dietary fatty acids on companion animal reproduction.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for enhancing reproductive performance in a companion animal consisting essentially of feeding said animal a diet including omega-6 and omega-3 fatty acids, wherein the ratio of said omega-6 fatty acids to said omega-3 fatty acids is from about 3.5:1 to about 12.5:1.

2. A process for maintaining litter size through subsequent parities of a companion animal consisting essentially of feeding said animal a diet including omega-6 and omega-3 fatty acids, wherein the ratio of said omega-6 fatty acids to said omega-3 fatty acids is from about 3.5:1 to about 12.5:1.

3. A process for increasing live births through subsequent parities of a companion animal consisting essentially of feeding said animal a diet including omega-6 and omega-3 fatty acids, wherein the ratio of said omega-6 fatty acids to said omega-3 fatty acids is from about 3.5:1 to about 12.5:1.

4. A process for decreasing still births through subsequent parities of a companion animal consisting essentially of feeding said animal a diet including omega-6 and omega-3 fatty acids, wherein the ratio of said omega-6 fatty acids to said omega-3 fatty acids is from about 3.5:1 to about 12.5:1.

5. The process according to claim 1 wherein at least 15% of the total fatty acids in said diet are omega-6 fatty acids.

6. The process according to claim 1 wherein at least 2% of the total fatty acids in said diet are omega-3 fatty acids.

7. The process according to claim 1 wherein said diet includes, on a dry matter basis, from about 2.5 to 7.5% by weight omega-6 fatty acids and from about 0.3 to 1.5% by weight omega-3 fatty acids.

8. The process according to claim 1 wherein the ratio of said omega6 fatty acids to said omega-3 fatty acids is from about 5:1 to about 10:1.

9. The process according to claim 8 wherein the ratio of said omega-6 fatty acids to said omega-3 fatty acids is from about 5:1 to about 8:1.

10. The process according to claim 1 wherein said animal is a dog.

11. The process according to claim 10 wherein said diet comprises, on a dry matter basis, about 22 to 44% by weight protein, and about 10 to 30% by weight fat.

12. The process according to claim 11 wherein said diet comprises, on a dry matter basis, about 25 to 35% by weight protein, and about 15 to 25% by weight fat.

13. The process according to claim 1 wherein said animal is a cat.

14. The process according to claim 13 wherein said diet comprises, on a dry matter basis, about 22 to 44% by weight protein, and about 10 to 30% by weight fat.

15. The process according to claim 14 wherein said diet comprises, on a dry matter basis, about 25 to 35% by weight protein, and about 15 to 25% by weight fat.

16. The process according to claim 1 wherein said animal is fed said diet throughout the reproductive process.

17. The process according to claim 2 wherein at least 15% of the total fatty acids in said diet are omega-6 fatty acids.

18. The process according to claim 2 wherein at least 2% of the total fatty acids in said diet are omega-3 fatty acids.

19. The process according to claim 2 wherein said diet includes, on a dry matter basis, from about 2.5 to 7.5% by weight omega6 fatty acids and from about 0.3 to 1.5% by weight omega-3 fatty acids.

20. The process according to claim 2 wherein the ratio of said omega-6 fatty acids to said omega-3 fatty acids is from about 5:1 to about 10:1.

21. The process according to claim 20 wherein the ratio of said omega-6 fatty acids to said omega-3 fatty acids is from about 5:1 to about 8:1.

22. The process according to claim 2 wherein said animal is a dog.

23. The process according to claim 22 wherein said diet comprises, on a dry matter basis, about 22 to 44% by weight protein, and about 10 to 30% by weight fat.

24. The process according to claim 23 wherein said diet comprises, on a dry matter basis, about 25 to 35% by weight protein, and about 15 to 25% by weight fat.

25. The process according to claim 2 wherein said animal is a cat.

26. The process according to claim 25 wherein said diet comprises, on a dry matter basis, about 22 to 44% by weight protein, and about 10 to 30% by weight fat.

27. The process according to claim 26 wherein said diet comprises, on a dry matter basis, about 25 to 35% by weight protein, and about 15 to 25% by weight fat.

28. The process according to claim 2 wherein said animal is fed said diet throughout the reproductive process.

29. The process according to claim 3 wherein at least 15% of the total fatty acids in said diet are omega-6 fatty acids.

30. The process according to claim 3 wherein at least 2% of the total fatty acids in said diet are omega-3 fatty acids.

31. The process according to claim 3 wherein said diet includes, on a dry matter basis, from about 2.5 to 7.5% by weight omega-6 fatty acids and from about 0.3 to 1.5% by weight omega-3 fatty acids.

32. The process according to claim 3 wherein the ratio of said omega-6 fatty acids to said omega-3 fatty acids is from about 5:1 to about 10:1.

33. The process according to claim 32 wherein the ratio of said omega-6 fatty acids to said omega-3 fatty acids is from about 5:1 to about 8:1.

34. The process according to claim 3 wherein said animal is a dog.

35. The process according to claim 32 wherein said diet comprises, on a dry matter basis, about 22 to 44% by weight protein, and about 10 to 30% by weight fat.

36. The process according to claim 35 wherein said diet comprises, on a dry matter basis, about 25 to 35% by weight protein, and about 15 to 25% by weight fat.

37. The process according to claim 3 wherein said animal is a cat.

38. The process according to claim 37 wherein said diet comprises, on a dry matter basis, about 22 to 44% by weight protein, and about 10 to 30% by weight fat.

39. The process according to claim 38 wherein said diet comprises, on a dry matter basis, about 25 to 35% by weight protein, and about 15 to 25% by weight fat.

40. The process according to claim 3 wherein said animal is fed said diet throughout the reproductive process.

41. The process according to claim 4 wherein at least 15% of the total fatty acids in said diet are omega-6 fatty acids.

42. The process according to claim 4 wherein at least 2% of the total fatty acids in said diet are omega-3 fatty acids.

43. The process according to claim 4 wherein said diet includes, on a dry matter basis, from about 2.5 to 7.5% by weight omega-6 fatty acids and from about 0.3 to 1.5% by weight omega-3 fatty acids.

44. The process according to claim 4 wherein the ratio of said omega6 fatty acids to said omega-3 fatty acids is from about 5:1 to about 10:1.

45. The process according to claim 44 wherein the ratio of said omega6 fatty acids to said omega-3 fatty acids is from about 5:1 to about 8:1.

46. The process according to claim 4 wherein said animal is a dog.

47. The process according to claim 46 wherein said diet comprises, on a dry matter basis, about 22 to 44% by weight protein, and about 10 to 30% by weight fat.

48. The process according to claim 47 wherein said diet comprises, on a dry matter basis, about 25 to 35% by weight protein, and about 15 to 25% by weight fat.

49. The process according to claim 4 wherein said animal is a cat.

50. The process according to claim 49 wherein said diet comprises, on dry matter basis, about 22 to 44% by weight protein, and about 10 to 30% by weight fat.

51. The process according to claim 50 wherein said diet comprises, on a dry matter basis, about 25 to 35% by weight protein, and about 15 to 25% by weight fat.

52. The process according to claim 4 wherein said animal is fed said diet throughout the reproductive process.

\* \* \* \* \*